Nov. 17, 1959 W. F. JESSUP ET AL 2,912,795
TRANSFER MECHANISM
Filed Aug. 27, 1958 16 Sheets-Sheet 2
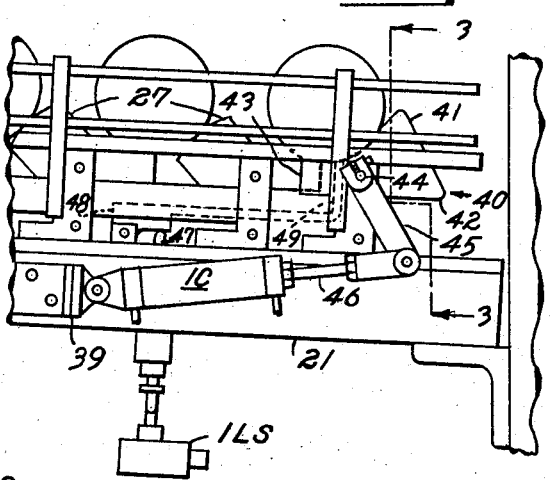
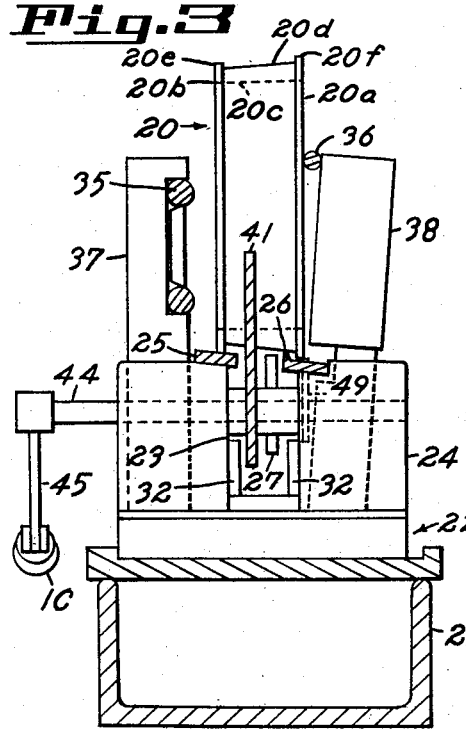
INVENTORS
WILBUR F. JESSUP,
MELVIN E. ASTON.
BY
ATTORNEYS.

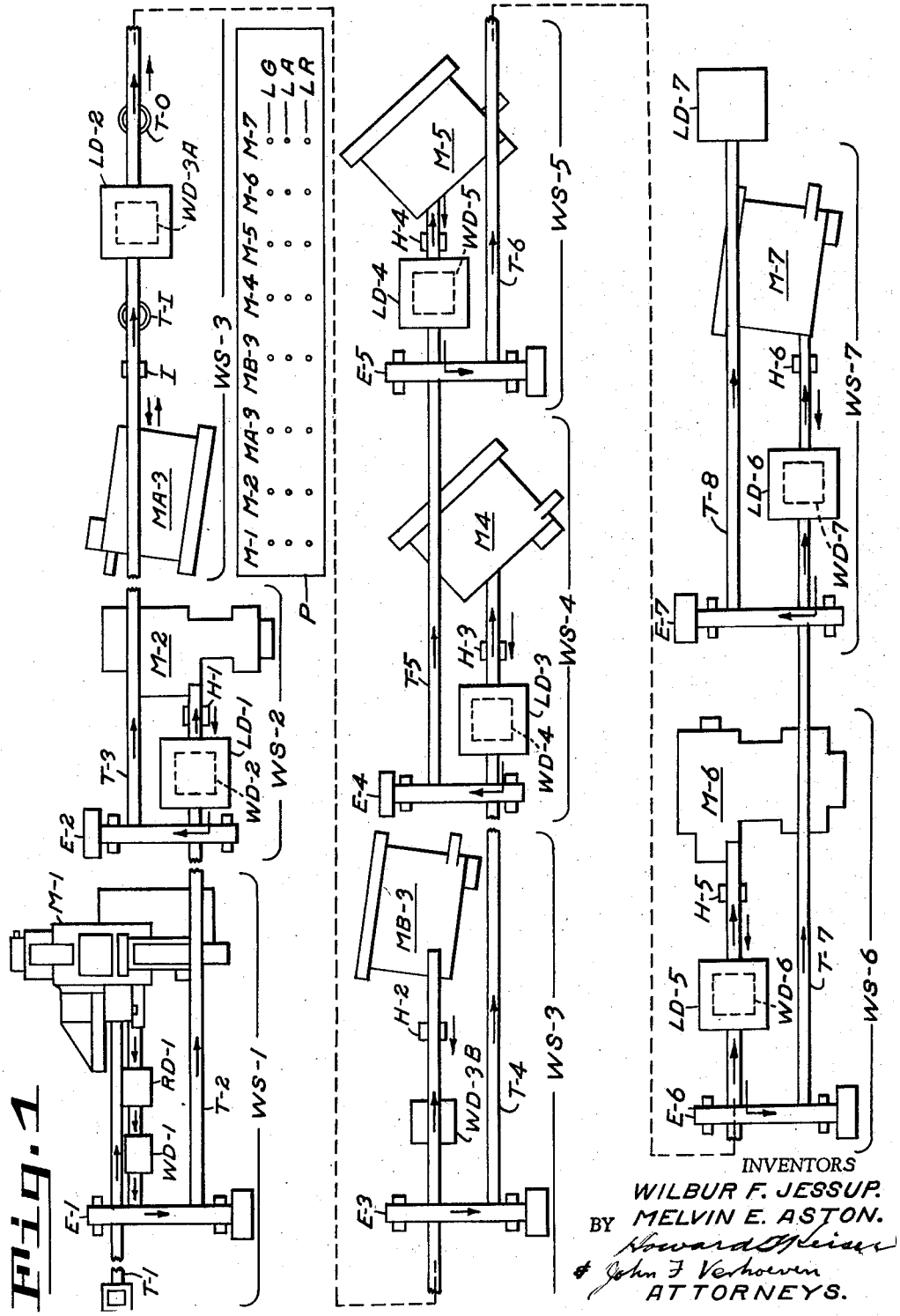

Nov. 17, 1959 W. F. JESSUP ET AL 2,912,795
TRANSFER MECHANISM
Filed Aug. 27, 1958 16 Sheets-Sheet 3

INVENTORS
WILBUR F. JESSUP.
MELVIN E. ASTON.
BY
ATTORNEYS.

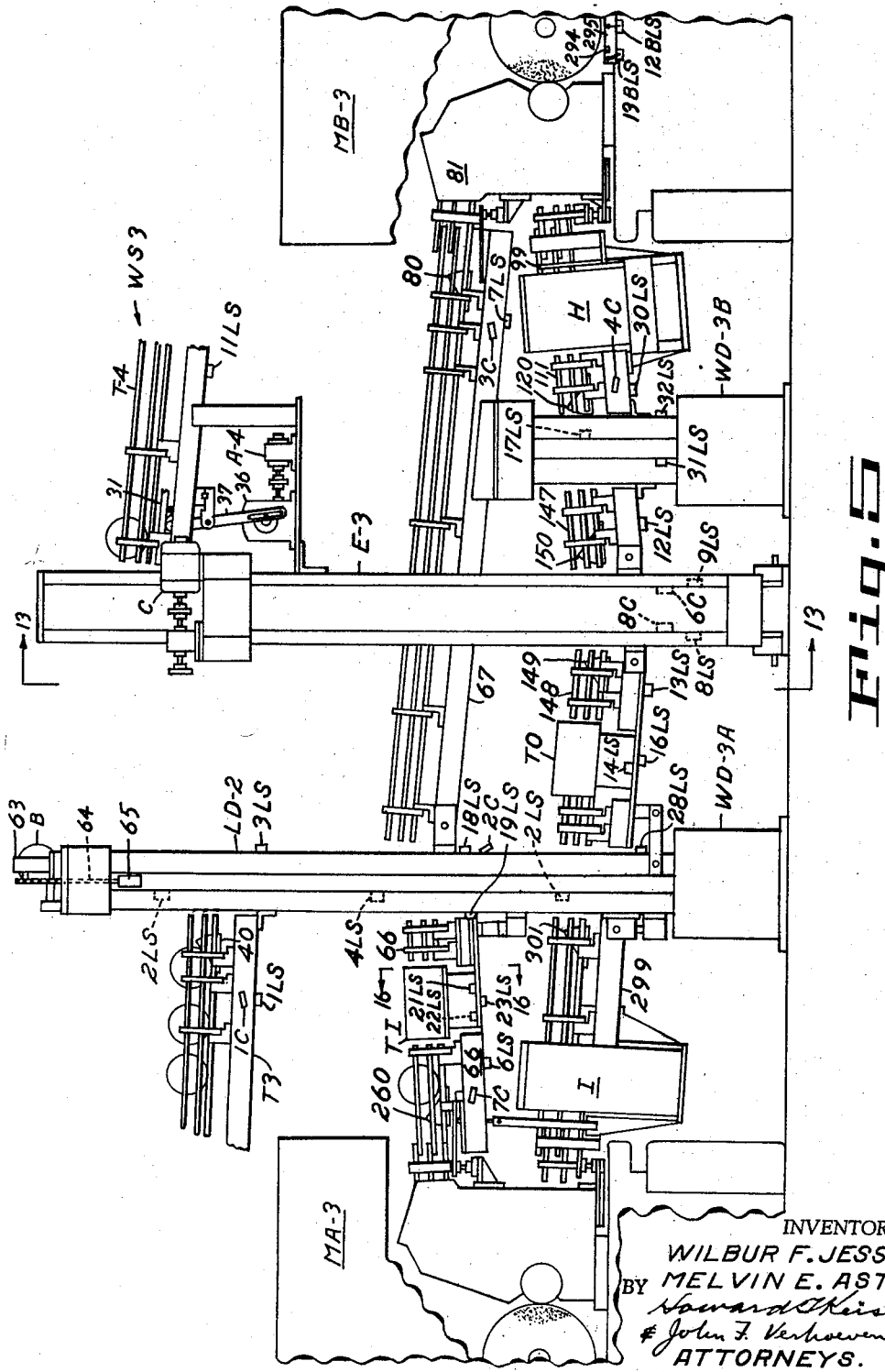

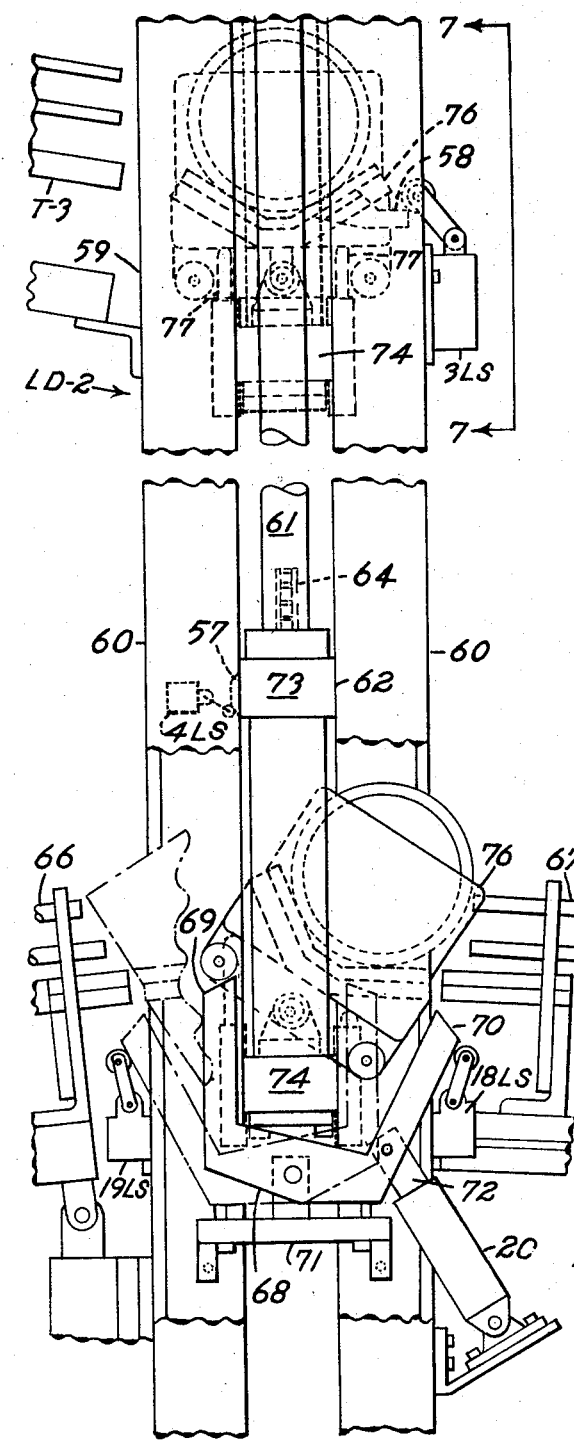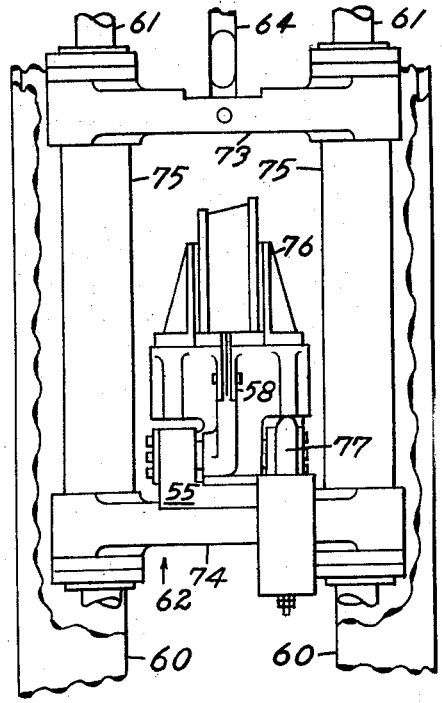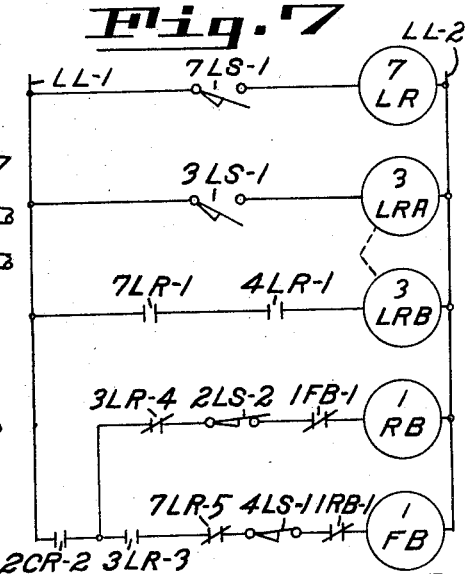

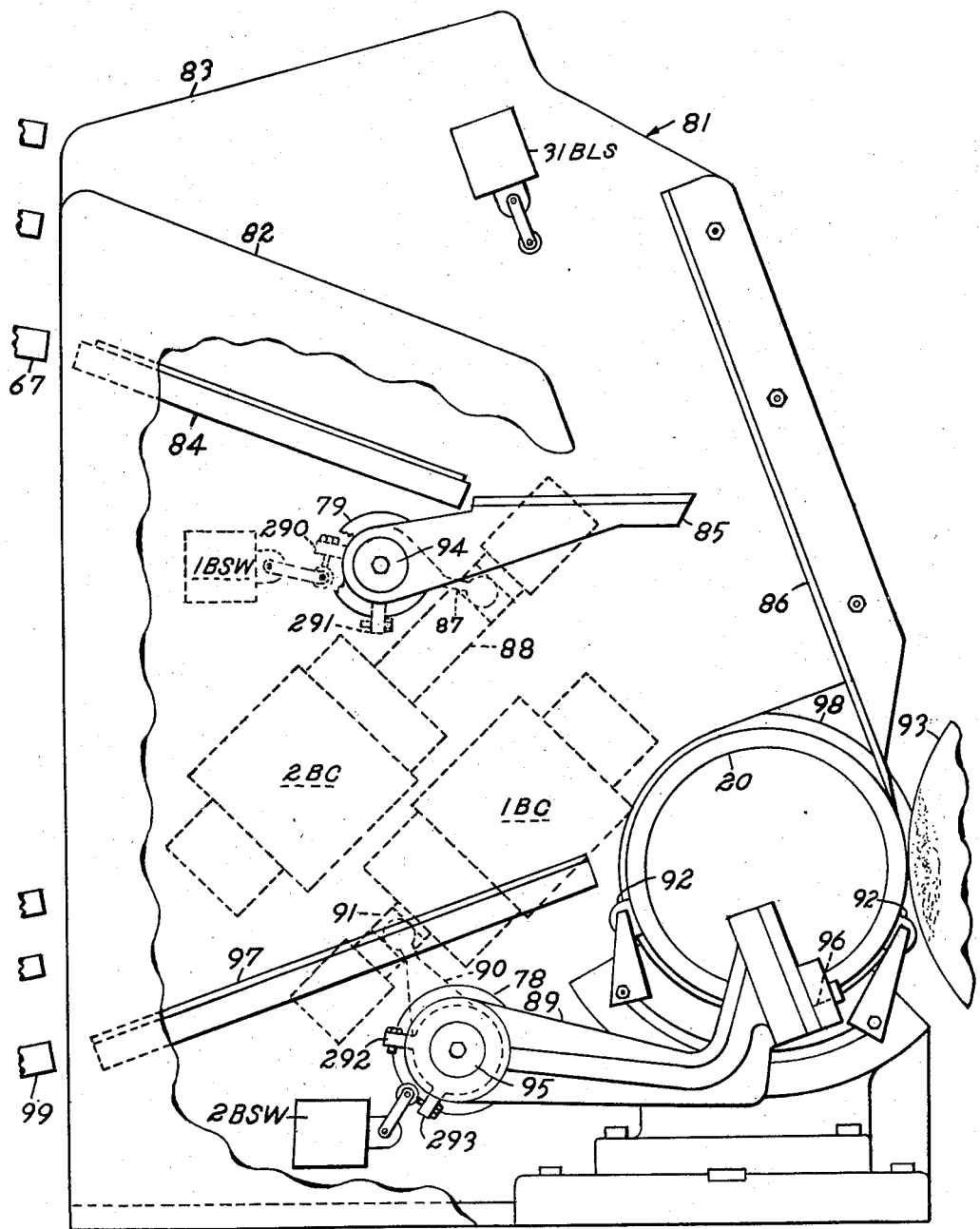

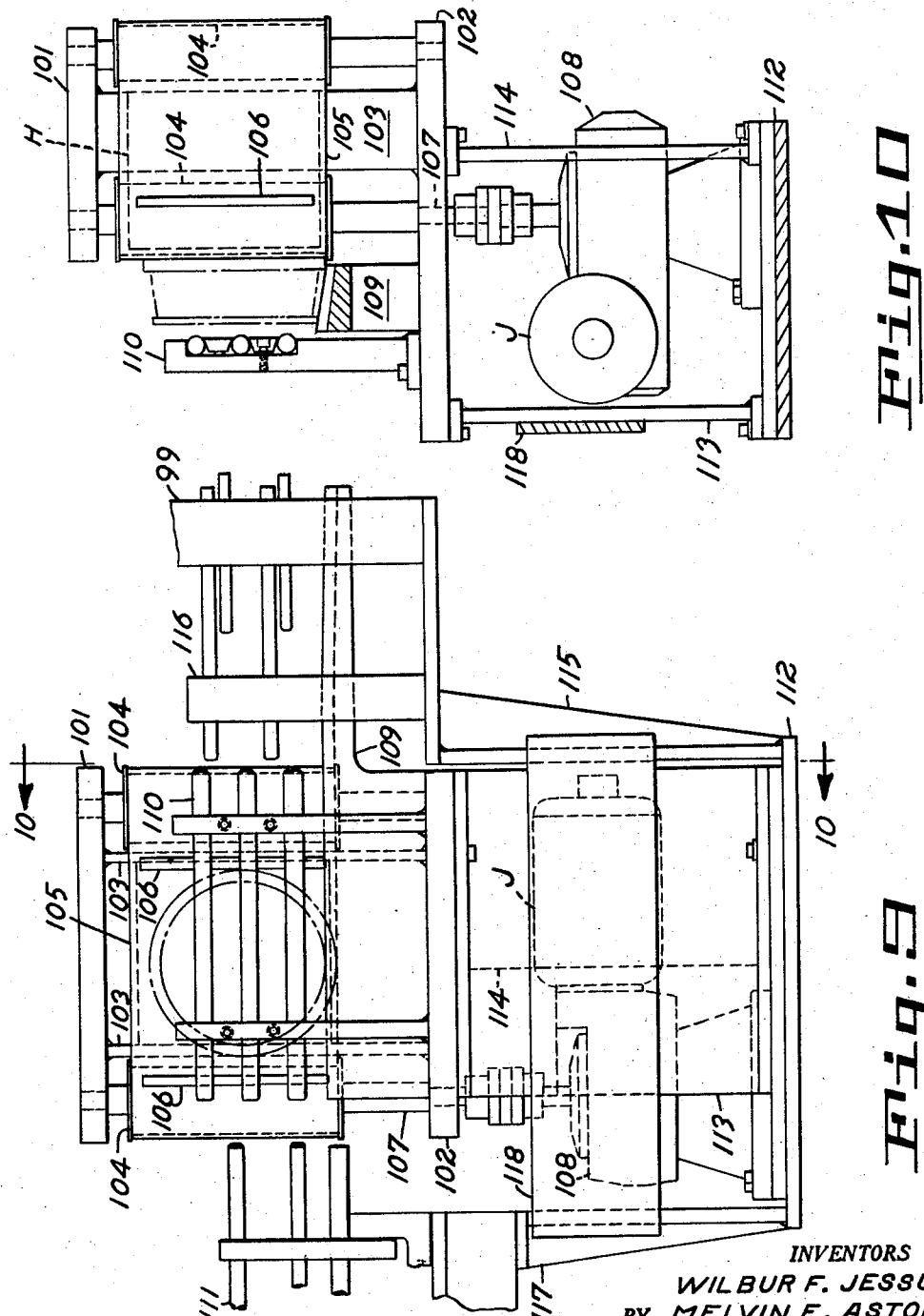

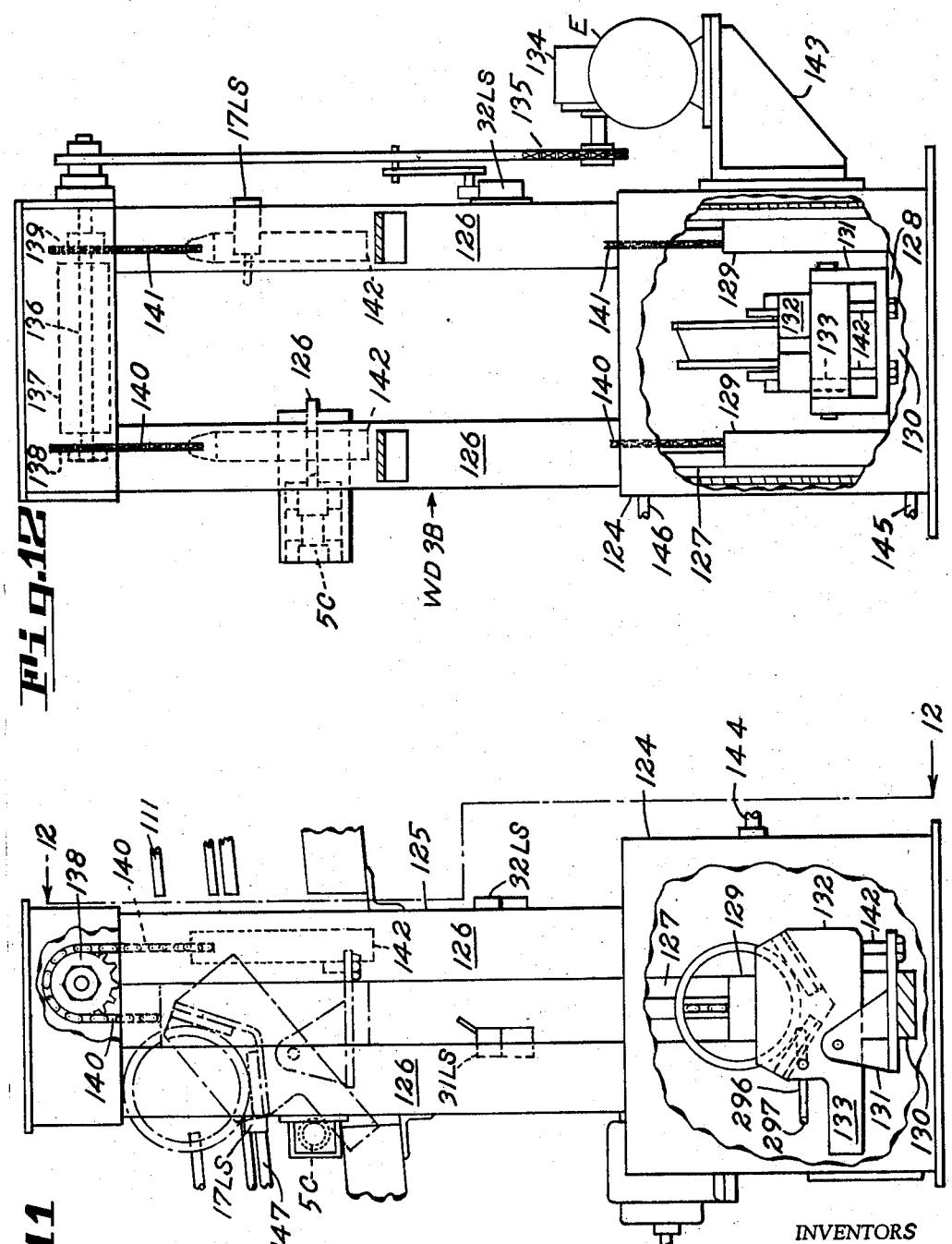

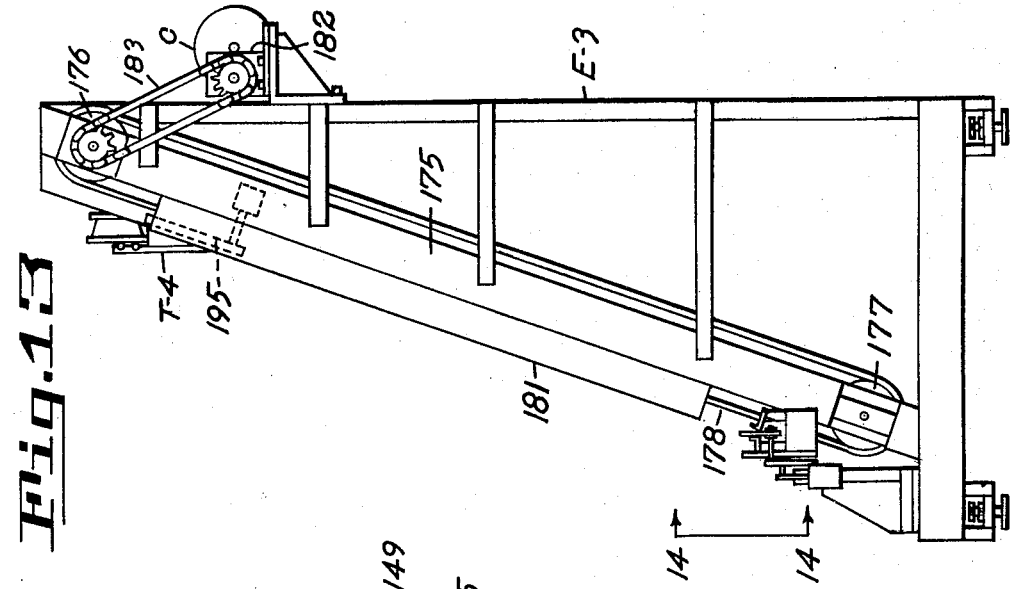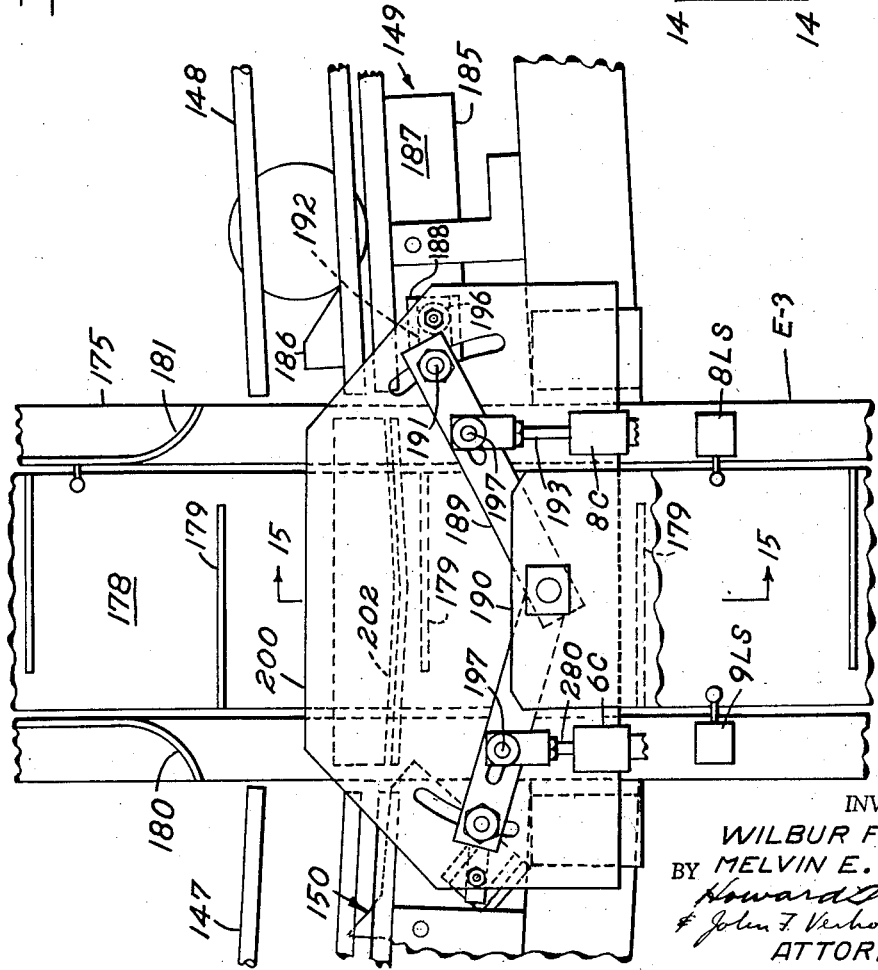

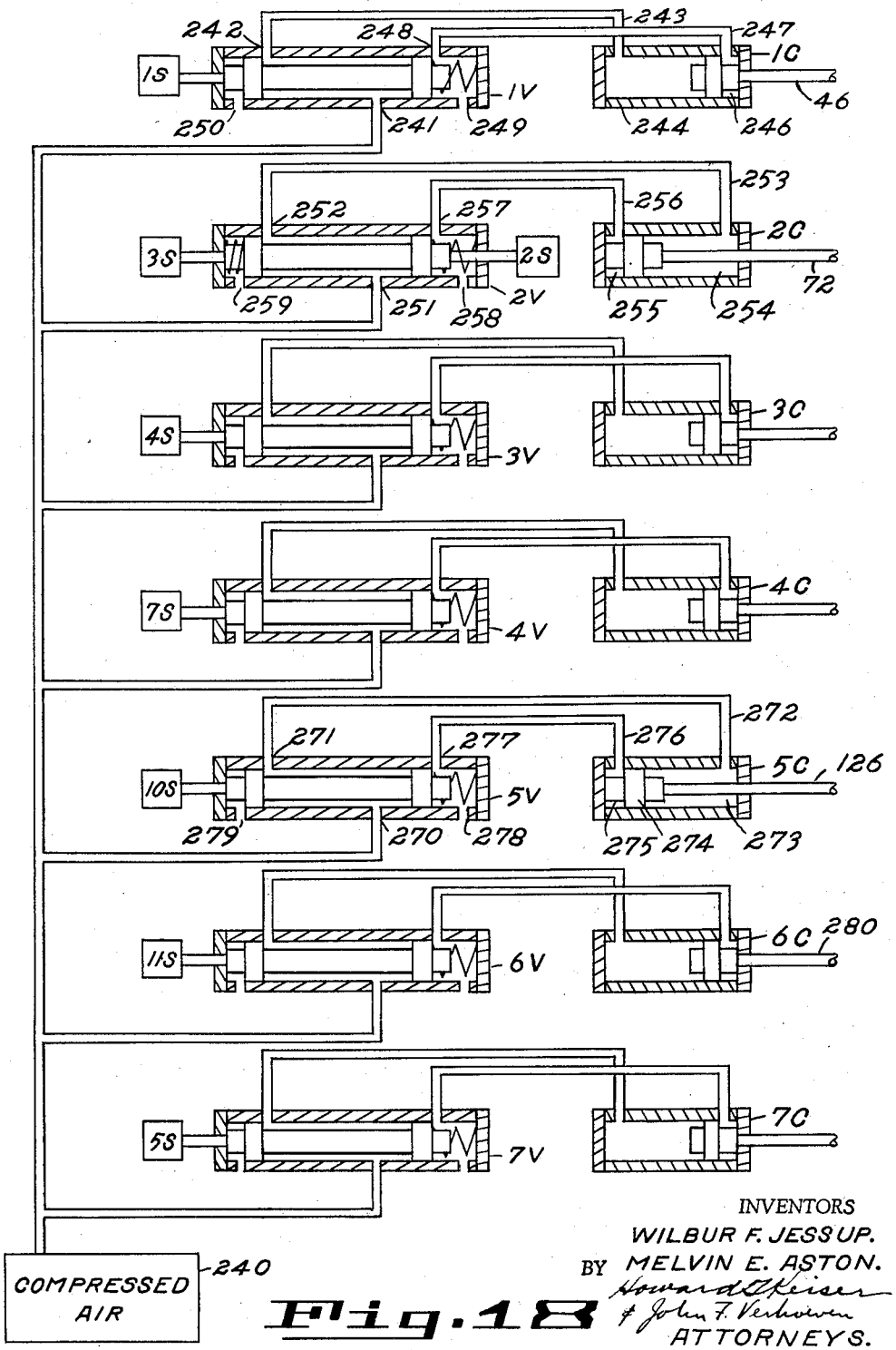

United States Patent Office 2,912,795
Patented Nov. 17, 1959

2,912,795

TRANSFER MECHANISM

Wilbur F. Jessup and Melvin E. Aston, Cincinnati, Ohio, assignors to The Cincinnati Milling Machine Co., Cincinnati, Ohio, a corporation of Ohio Application August 27, 1958, Serial No. 757,558

24 Claims. (Cl. 51—3)

The present invention relates to an apparatus and the control mechanism therefor for automatically performing a series of consecutive operations on workpieces.

In an automatic production line, where workpieces are carried through a series of consecutive work stations and are transported simultaneously or are transported without banking between stations, certain disadvantages arise from feeding the output from one work station directly to the next work station. Although the different work stations may have different capacities for producing operated workpieces, the rate of production at each station must be geared to the capacity of the slowest station, and the capacity of any other station in excess of this rate can never be realized. When one work station must be stopped for tool replacement, adjustment, or repairs, the entire line must be stopped, including, of course, the slowest station. The net capacity of the entire line is thus the capacity of the slowest station less the capacity lost from the total down time of the individual stations of the line.

In the present invention an improved apparatus defining an integrated production line, and a control system therefor, is provided in which each work station may operate at its maximum capacity, the excess capacity over that of the slowest station being stored automatically in banks between work stations. This excess capacity is then drawn upon automatically when one of the stations is down so that other stations of the line capable of operation may continue to operate. In the system of the present invention while the line can never, of course, exceed the capacity of the slowest station, the system operates automatically to minimize the capacity lost from down time on stations other than the slowest station.

With the construction of the present invention the banks upstream from the slowest station are kept full when the upstream stations are operating, and, in the event one of those stations is temporarily down, the slowest station may continue to operate by feeding on the banks, the capacity of the banks being restored after the station which was down is again in operation. Also, if a work station downstream from the slowest station is down, the slow station will continue to operate, filling up the downstream banks, so that when the station is again operating it can produce workpieces at a greater rate than the rate of the slowest station by feeding off the bank built up by the slow station during the down time. In this manner, the slowest station, which is the critical station in any production line, is automatically kept operating, despite temporary shutdowns at other stations of the line.

In the preferred embodiment of the invention, which, for illustrative purposes, is shown adapted for consecutive grinding operations on a large bearing race, the apparatus has a plurality of spaced work stations. Tracks which are elevated to provide quick and ready access to the work stations connect the consecutive work stations. The tracks are operable to move the workpiece downstream and to bank the workpieces on the track if workpieces are supplied to the track at a greater rate than they are consumed, the bank of workpieces building up from the downstream end of the track. As workpieces are removed from the track space becomes available at the upstream end of the track. Preferably, the track is of the type to move and bank the workpieces so they are at all times spaced from adjacent workpieces. Workpieces are automatically released from the bank on the track when a workpiece is required by the downstream station, and when any track between consecutive work stations is full the output of workpieces at the work station connected to the upstream end thereof is automatically terminated until space is again available on the track. Thus the work stations are automatically linked together in their operation so that while each station is fed by the preceding station and feeds the succeeding station, each may continue operating, despite the inoperativeness of any other work station, until the bank of workpieces on the upstream track, or the space available on the downstream track, is exhausted.

At each work station the workpieces are automatically passed singly through a series of devices and controlled to obviate contact with other workpieces within the work station. When delivery from the last device of any work station is terminated in response to a full downstream track, delivery from the preceding device is automatically terminated. Delivery from each device in the work station is automatically terminated when there is no space downstream for the workpiece. When there is no space in the first device an escapement at that device, which is located at the downstream end of the upstream track, holds workpieces on the track and a bank of workpieces is accumulated thereon since the upstream work station continues to produce workpieces until that track is full.

At work stations where one machine cannot grind workpieces fast enough to meet the minimum desired rate, a pair of machines operate in parallel relationship. Workpieces are automatically fed alternately to the two machines, or, if one machine is down, workpieces are automatically supplied continuously to the other machine. Thus, although one machine cannot indefinitely supply the requirements of the downstream stations, enough workpieces can be supplied when one machine is down to at least keep the downstream station operating intermittently and, if a sufficient bank had accumulated prior to the breakdown, and the down time is not too long, the downstream station may be kept operating continuously while the one machine is down.

Since workpieces are automatically delivered from the devices of the work station only when space is available at the next device, workpieces are not banked within the work stations. Hence, if one machine of a work station goes down, there is not a large supply of workpieces banked at that machine which would be unavailable until that machine is operating. Instead, the workpieces are banked on the upstream track and are all automatically diverted to the operating machine of the work station and become available for the downstream work station even if the down machine remains down.

An automatic signaling system is provided which keeps the operator of the line informed at all times as to the status of the machines. If a machine is cycling continuously at its normal rate a green light indicates that fact to the operator. If a machine, although capable of cycling workpieces, is not doing so either because no workpiece is available or no space is available to receive workpieces, an amber light is energized. If the machine becomes incapable of cycling workpieces a red light is immediately energized. On the basis of these automatic signals the operator can take immediate action to keep the line producing finished workpieces.

It is, therefore, an object of the present invention to provide an apparatus for automatically performing a series of consecutive operations on workpieces.

It is another object to provide an apparatus in which consecutive operations on workpieces are performed at a series of work stations, and in which workpieces are automatically banked between work stations when the rate of production of the upstream work station exceeds the rate at which workpieces are consumed by the downstream station.

It is yet another object of the present invention to provide a control mechanism for an apparatus operable to perform a series of consecutive operations on workpieces in which the workpieces are automatically controlled to move through the apparatus without contact with other workpieces.

It is still another object of the present invention to provide an apparatus operable to perform a series of grinding operations on a workpiece and automatically wash the workpiece after each grinding.

It is another object of the present invention to provide an apparatus in which a series of operations are performed at consecutive work stations and in which workpieces are automatically banked between work stations when the rate of production of the upstream work station exceeds the rate at which workpieces are consumed by the downstream station and in which the work station automatically terminates production of workpieces when the downstream bank is full.

It is a further object of the present invention to provide an apparatus for consecutive operations on workpieces with a series of work stations connected by tracks defining banks for the workpieces in which a work station is fed by the preceding station and feeds the succeeding station and may continue operating, despite the inoperativeness of any other work station, until the bank of parts on the upstream track or the space available on the downstream track is exhausted.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a somewhat schematic plan view of the apparatus of the present invention;

Fig. 2 is an elevational view of the downstream end of one of the tracks connecting consecutive work stations;

Fig. 3 is a sectional view of the track taken on the line 3—3 of Fig. 2;

Fig. 5 is an elevational view of the work station having two machines;

Fig. 6 is an elevational view of a lowering device, viewed as shown in Fig. 5;

Fig. 7 is a view of a portion of the lowering device taken on the line 7—7 of Fig. 6 showing the cradle and carriage therefor when in the elevated position;

Fig. 8 is an elevational view of the loading mechanism of the machine on the right in Fig. 5, viewed as shown in Fig. 5;

Fig. 9 is an elevational view of the demagnetizing unit on the right in Fig. 5 viewed as shown in Fig. 5;

Fig. 10 is a sectional view taken on the line 10—10 of Fig. 9;

Fig. 11 is an elevational view of the wash device on the right in Fig. 5 viewed as shown in Fig. 5;

Fig. 12 is a view taken on the line 12—12 of Fig. 11;

Fig. 13 is a view taken on the line 13—13 of Fig. 5 showing the elevating device;

Fig. 14 is a view taken on the line 14—14 of Fig. 13;

Fig. 16 is a view of the "in" turnaround taken on the line 16—16 of Fig. 5;

Fig. 18 is a schematic diagram of the pneumatically operated mechanisms of the work station;

Figure 24:
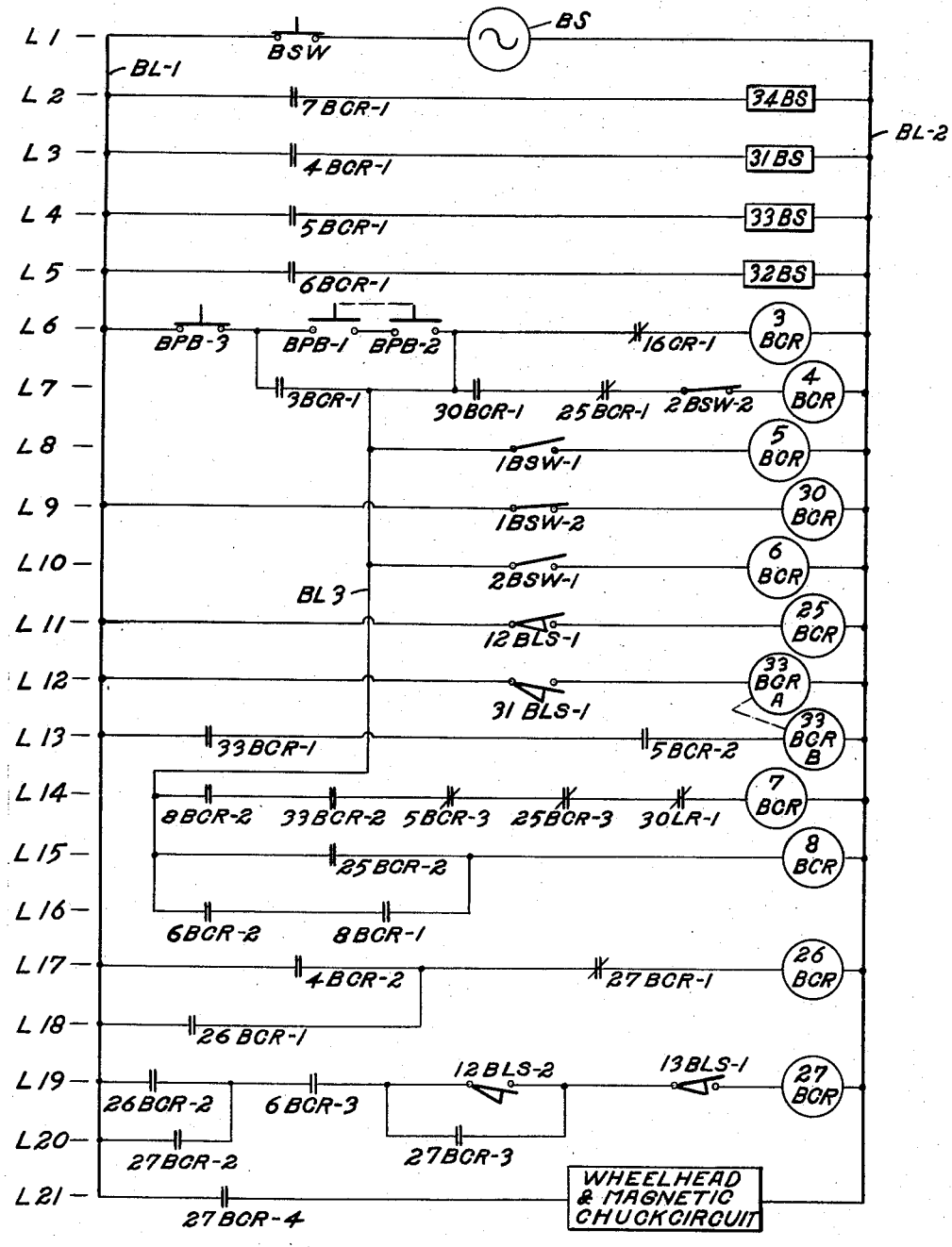

Figs. 19, 20, 21, 22, and 23 are schematic electrical diagrams for the mechanisms of the work station;

Fig. 24 is a schematic electrical diagram of a portion of the circuit of the machine; and Fig. 25 is a schematic electrical diagram of a portion of the circuit for a single machine station.

The apparatus of the present invention comprises a transfer mechanism which automatically carries workpieces, preferably roller workpieces such as a railroad bearing cone 20 (see Fig. 3) along a predetermined path through a plurality of successive operations. As shown in Fig. 1, the apparatus comprises a plurality of spaced mechanisms defining work stations, each work station performing one of the operations on the workpiece. Workpieces are conveyed consecutively to work station WS-1 where the end faces 20a and 20b of the workpiece are ground, work station WS-2 where the inner surface 20c is rough ground, work station WS-3 where the outer surface 20d and the peripheries of the ribs 20e and 20f are ground, work station WS-4 where the inner surfaces of the ribs 20e and 20f are rough ground, work station WS-5 where the inner surfaces of the ribs 20e and 20f are finish ground, work station WS-6 where inner surface 20c is finish ground, and work station WS-7 where outer surface 20d is finish ground. Workpieces are conveyed to work station WS-1 on track T-1 and conveyed between the successive stations on elevated tracks T-2, T-3, T-4, T-5, T-6, and T-7 and conveyed from the last work station WS-7 to a lowering device LD-7 on track T-8.

The typical work station has a plurality of devices including operational devices such as a grinding machine and a wash device, and conveying devices such as a lowering device and an elevating device connected in series through which the workpiece is passed for the operation at that station. In Fig. 1 the movement of workpieces between stations, and within the stations, is indicated by the arrows shown on the tracks and ways, and arrows at the sides thereof indicate movement in the direction shown by the arrow on a way below the track or way shown. At work station WS-1 workpieces are passed from track T-1 consecutively through machine M-1, raising device RD-1, wash device WD-1, and elevating device E-1 to track T-2. At work station WS-2 workpieces are passed consecutively through lowering device LD-1, machine M-2, demagnetizer H-1, wash device WD-2, and elevating device E-2 to track T-3. Work station WS-3 has two parallel branches of devices, workpieces being fed alternately to one branch and then the other, or to one branch continuously if the machine of the other branch does not require workpieces. Workpieces are fed from track T-3 to lowering device LD-2 and either to one branch comprising "in" turnaround T-I, machine MA-3, demagnetizer I, wash station WD-3A, "out" turnaround T-O, or the other branch comprising machine MB-3, demagnetizer H-2, and wash device WD-3B. Workpieces from both branches are fed to elevating devices E-3 and track T-4. At work station WS-4, workpieces are fed from track T-4 to lowering device LD-3, machine M-4, demagnetizer H-3, wash device WD-4, and elevating device E-4 to track T-5. At work station WS-5, workpieces are supplied from track T-5 to lowering device LD-4, machine M-5, demagnetizer H-4, wash device WD-5, and elevating device E-5 to track T-6. At work station WS-6 workpieces are supplied from track T-6 to lowering device LD-5, machine M-6, demagnetizer H-5, wash device WD-6, and elevating device E-6 to track T-7. At work station WS-7, workpieces are supplied from track T-7 to lowering device LD-6, machine M-7, demagnetizer H-6, wash device WD-7, and elevating device E-7 to track T-8. Machine M-1 is an end grinder, machines M-2 and M-6 are internal grinders, and machines MA-3, MB-3, M-4, M-5, and M-7 are external centerless grinders. A centrally located operator's station includes a panel P with a set of signaling lights LG, LA, and LR for each machine.

Figure 4:
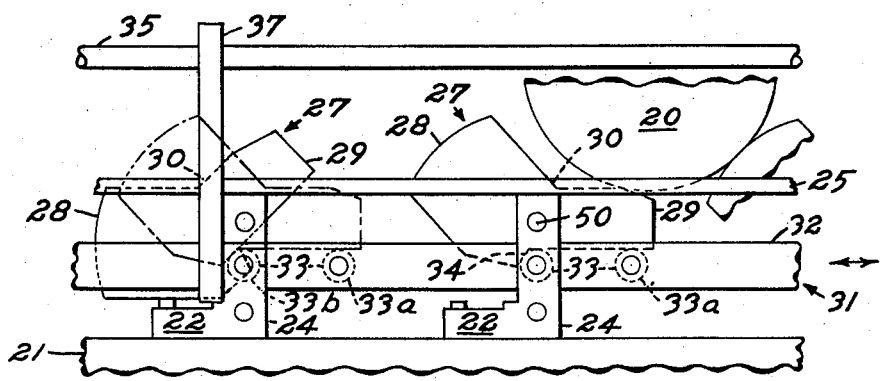
Fig. 4 is an elevational view of the track to illustrate the operation thereof.

Tracks T-1, T-2, T-3, T-4, T-5, T-6, T-7, and T-8 operate to move workpieces downstream and bank the workpieces if the downstream station is not consuming workpieces as fast as they are delivered to the track by the upstream station, building up a bank from the downstream end. Preferably the tracks keep the workpieces in spaced relationship during movement and banking as shown in Figs. 2, 3 and 4. The track, which is elevated and inclined in the downstream direction, comprises a base 21, a plurality of longitudinally spaced brackets 22 on the base, the brackets having a slot 23 in their upstanding legs 24, and a pair of rails 25 and 26 which are supported by the upstanding legs 24 in straddling relation to the slots 23 and are adapted to support the workpiece. Flippers 27 are pivotally mounted on pins 50 in the slots 23 and have an upstream portion 28 and a downstream portion 29 at an angle to the upstream portion so that the upper surface of the flipper defines a cradle 30. The flippers pivot between a receive position (as shown in solid lines of the left flipper of Fig. 4) where the upstream portion is out of the path of a workpiece on the rails and the downstream portion extends between the rails into the path of a workpiece so that a workpiece may roll into the cradle 30, and a deliver position (as shown in phantom lines of the left flipper of Fig. 4) where the downstream portion 29 is lowered to allow a workpiece to roll out of the cradle, and the upstream portion 28 extends between the rails into the path of a workpiece. The flippers are unbalanced so that they normally assume the receive position but are held in the deliver position by a workpiece over the downstream portion thereof. The flippers in the receive position are periodically flipped to their deliver position by a reciprocating shuttle 31. The shuttle is reciprocated by a motor such as motor A-4 for track T-4 operating through a gear reducer 36 and link 37 (see Fig. 5).

The shuttle 31 consists of a pair of parallel spaced bars 32 received in the slots 23 and having rollers 33 between the bars spaced to correspond to the spacing of the flippers. When the shuttle is in its downstream position with the rollers at position 33a (Fig. 4) the rollers are disengaged from the flippers, and the flippers, unless a workpiece is over the downstream portion, assume their normal receive position. When the shuttle 31 is moved upstream toward the position shown at 33b (Fig. 4), the rollers thereof engage shoulders 34 of those flippers not held in the deliver position by a workpiece thereon, and the shuttle flips the flippers to the deliver position carrying any workpieces which may be in the cradle 30 over the flippers so that they may roll to the next flipper. The workpiece must be lifted off the track to pass the flipper, and since the flippers are not spaced sufficiently far apart for the workpiece to achieve sufficient inertia to lift itself over the flippers, workpieces are stopped at each flipper until the shuttle moves upstream to engage and pivot the flipper. Also, the flippers are spaced sufficiently close so that a workpiece which engages the upstream portion of a flipper is held over the downstream portion of the next upstream flipper. This, in turn, holds that flipper in the deliver position where it is not engaged by the shuttle so that the following workpiece engages its upstream portion. Thus, a bank may be built up from the downstream end of the track while workpieces are moved on the track downstream to the bank, and at no time will the workpieces contact each other. Guide rails 35 and 36, respectively, are supported by brackets 37 and 38, respectively, connected to brackets 22 and extend along the track on each side of the rails to hold workpieces thereon.

The track has an escapement 40 at its downstream end on track T-3 which is similar in construction to all the escapements of the apparatus except that at the elevating device E-3. The escapement has a flipper 41 which, like other flippers, has a downstream and upstream portion 42 and 43 respectively, the upper surfaces of which define a cradle. Flipper 41 is mounted in slot 23 of the downstream bracket 22 and pivots on shaft 44 between a first position where it receives and holds a workpiece and a second position where it releases a workpiece. However, flipper 41 is not powered by the shuttle but, instead, shaft 44 journaled in leg 24 of bracket 22 is connected through link 45 to rod 46 of cylinder 1C for positive operation. Cylinder 1C is pivotally connected to bracket 39 connected to base 21 of the track.

Limit switches 1LS and 11LS are mounted on the track as shown in Figs. 2 and 5, the former at the downstream end for operation by a workpiece at the escapement 40 and the latter near the upstream end to be operated by a workpiece held at that position as the banking workpieces fill the track to the desired amount. The limit switch 1LS is mounted under the base 21 of the track and has a movable plunger 47 which operates the switch and extends through the base. An arm 48 is pivotally mounted on top of the base 21 to engage near one end thereof the plunger 47. The arm has at its opposite end a finger 49 extending through the rail 26 for operation by a workpiece at the escapement 40. Other limit switches on the track and ways in the apparatus may be mounted in a similar manner.

As shown in Fig. 5, the devices of the third work station WS-3, which are typical of devices at all stations, include a lowering device LD-2, which is contained in the same frame as wash device WD-3, over that unit. As shown in Figs. 6 and 7, the frame 59 consists of four spaced angles 60, the legs of which constitute the sides of the frame, the space between the legs of the angles defining elongated vertical openings. Within the frame are two spaced vertical rods 61 upon which a slidable cradle carriage 62 is received. The carriage is moved up and down by motor B (see Fig. 5) operating through gear reducer 63 and chain 64, one end of which is connected to carriage 62 and the opposite end of which is connected to a counterweight 65 behind the frame. Within the frame and adjacent ways 66 and 67 leading respectively to machines MA-3 and MB-3 is unloader 68 having a pair of spaced upstanding arms 69 and 70. The unloader 68 is pivotally mounted on support 71 connected to the frame and is selectively shifted to the left (as shown in phantom lines in Fig. 6) toward track 66 and machine MA-3 or to the right (as shown in solid lines in Fig. 6) toward track 67 and machine MB-3 by pneumatic cylinder 2C, the piston rod 72 of which is pivotally connected to arm 70 of the unloader.

The cradle carriage 62 has a top cross member 73, a bottom cross member 74, and connecting vertical sleeves 75 which slidably receive the rods 61. A cradle 76 adapted to support a workpiece therein is pivotally mounted on the yoke 55 connected to the bottom cross member 74 between the sleeves 75 and is normally held in an upstanding position by a pair of spring urged pins 77 carried in casings connected on each side of the bottom member 74. When the cradle is in the top position, as shown in dotted lines in Fig. 6, the cradle is upright and receives a workpiece released from track T-3. The unloader is, at this time, set to, for example, the right, and when the cradle carriage descends, the left arm 69 contacts one side of the cradle and tilts it to the right between the angles 60, delivering the workpiece thereon to the way 67.

The ways 66 and 67, and the other ways within the work stations, are inclined in the downstream direction and provide a gravity flow path for the roller workpieces between devices of the station. The ways may be constructed similar to the track, with rails supported on brackets and guide rods, but without flippers and shutters or other powering means.

A workpiece which is received on way 67 rolls to the escapement 80 at machine MB-3 which is actuated by cylinder 3C and has limit switch 7LS to signify the presence of a workpiece. When the escapement is actuated a workpiece is released and rolls into the machine loader 81. As shown in Fig. 8 the loader has side plates 82 and 83 to guide the workpieces therein. The workpiece rolls over a fixed inclined platform 84 between the side plates onto the top arm 85 and contacts an elongated guide member 86 which stops the workpiece. The top arm 85 is non-rotatably mounted on a shaft 94 which extends through a boss 79 in the side plate 83 and, behind that plate as viewed in Fig. 8, the shaft carries a link 87 connected to the piston rod 88 of hydraulic cylinder 2BC. When the piston rod is retracted, the top arm swings down to permit passage of a workpiece between the arm 85 and the guide 86, the arm preventing the workpiece from rolling out of the loader. The loader has a bottom arm 89, swingable in a vertical plane spaced from the vertical plane in which the upper arm swings, which has a projecting finger 96 for engagement with the workpiece. The bottom arm 89 is non-rotatably received on shaft 95, extending through boss 78 in plate 83, which is rotated through link 90 by cylinder 1BC. The bottom arm is pivoted between an upper position when the piston rod 91 of that cylinder is extended and a lower position when the piston rod is retracted. The finger 96 of the lower arm receives a workpiece from the upper arm as the latter arm swings down, and the bottom arm guides the workpiece onto the shoes 92 of the machine into the operating position. The machine may, for example, be an external centerless grinding machine of the type shown in U. S. Letters Patent 2,478,607. The workpiece is held on the shoes 92 by magnetic chuck 98 for grinding. After the workpiece is ground by the wheel 93, the lower arm is raised, and, since the upper arm has pivoted to its upper position, the workpiece 20 rolls down platform 97 to the way 99 leading to the demagnetizer unit.

As shown in Figs. 9 and 10, the unit in which the demagnetizer H is carried consists of a top plate 101 and a base plate 102 connected by vertical members 103. Four spaced vertical drums 104 are carried on shafts between the top and base plate, the shafts being rotatably mounted in said plates. An endless nylon belt 105 having spaced cleats 106 is received snugly around the drums. The shaft 107 of one of the drums extends through the bottom plate 102 and is connected to gear reducer 108 which is driven by motor J for rotation of shaft 107 and the drum 104 mounted on said shaft to drive the belt 105. The motor and gear reducer are mounted on a platform 112 which is suspended below the base plate 102 by supports 113 and 114. Support 115 is mounted on the platform 112 and guides 116 forming a portion of way 99 are carried thereon. Support 117 is mounted on platform 112 and supports one end of way 111 leading to the wash device escapement. The band 118 connected to member 113 supports members 115 and 117. The race 109 is connected to the top of the base plate 102 adjacent the endless belt, and guide rails 110 are mounted on the base plate beside the race 109 opposite the belt to define a path for the workpiece. The demagnetizer H is mounted between the vertical members 103 inside the endless belt. The race 109 forms a portion of the way 99 which is connected to machine MB-3, and as the workpiece rolls from the machine onto the race it is drawn against the belt 105 and is engaged by one of the cleats 106 thereon. The belt then draws the workpiece through the magnetic field established by the demagnetizer H to the way 111 which is aligned with race 109, and the workpiece rolls to the escapement 120 at the wash device WD-3B. The demagnetizer I is contained in a similar unit with a belt driven by motor K.

As shown in Figs. 11 and 12, the wash device WD-3B has an upstanding frame 125 consisting of four spaced angles 126. On two opposite sides of the frame, guide rails 127 are secured between the legs of the angles, the space between the legs of the angles on the other sides of the frame defining elongated vertical openings. A carriage 128 has side members 129 adapted to slidably engage the guide rails, and a base 130. A yoke 131 is secured to the base of the carriage and pivotally holds a cradle 132 adapted to receive a workpiece. The cradle on one side has an extending arm 133 which projects through the opening on one side of the frame. At the bottom of the frame is a tank 124 having an inlet pipe 144, a discharge pipe 145 and an overflow pipe 146. The tank 124 is adapted to receive the carriage 128 and cradle 132 and circulate a cleansing fluid therethrough to wash the workpieces. The carriage and cradle are moved up and down by a motor E and gear reducer 134 mounted on platform 143 connected to tank 124 and operating through endless chain 135. The chain 135 drives a shaft 136 received in a bushing 137 at the top of the frame and drives sprockets 138 and 139 engaged respectively with chains 140 and 141. These chains connect at one end to the side members 129 and at the opposite end to counterweights 142. The cradle 132 as mounted in the yoke 131 is unbalanced and normally falls against stop bolts 142 of the yoke to an upright position in which position the cradle receives a workpiece from way 111 when it is at the top. Cylinder 5C is mounted on the frame 125, and its piston rod 126, when extended, protrudes into the path of arm 133 of cradle 132. As the cradle ascends, after having lowered a workpiece into the tank for washing, arm 133 contacts the extended piston rod 126 and the cradle is tilted, as shown in phantom lines in Fig. 11, to deliver a workpiece to way 147 leading to the elevating device escapement 150. After a workpiece leaves the cradle, the cradle drops to its normal upright position and is ready to receive another workpiece from way 111.

The raising device RD-1 of the first work station WS-1 may be constructed similarly to the wash device WD-3B except it would not have a tank, the way leading to the device would be connected to deliver a workpiece to the cradle when it is at the bottom, and the tilting pin would be permanently located in the path of the tilting arm.

Figure 15:
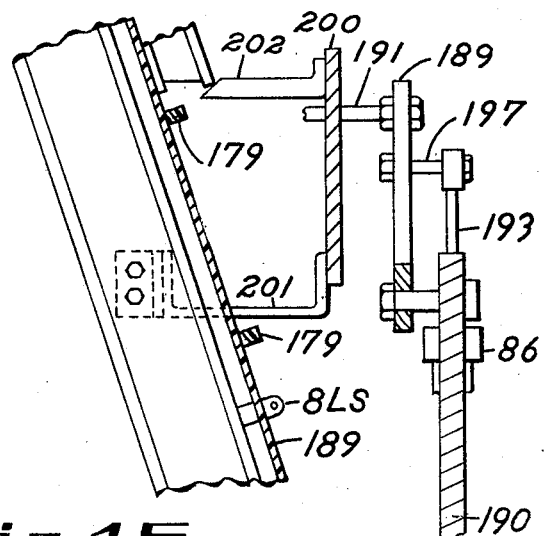
Fig. 15 is a sectional view taken on the line 15—15 of Fig. 14.
Figure 19:
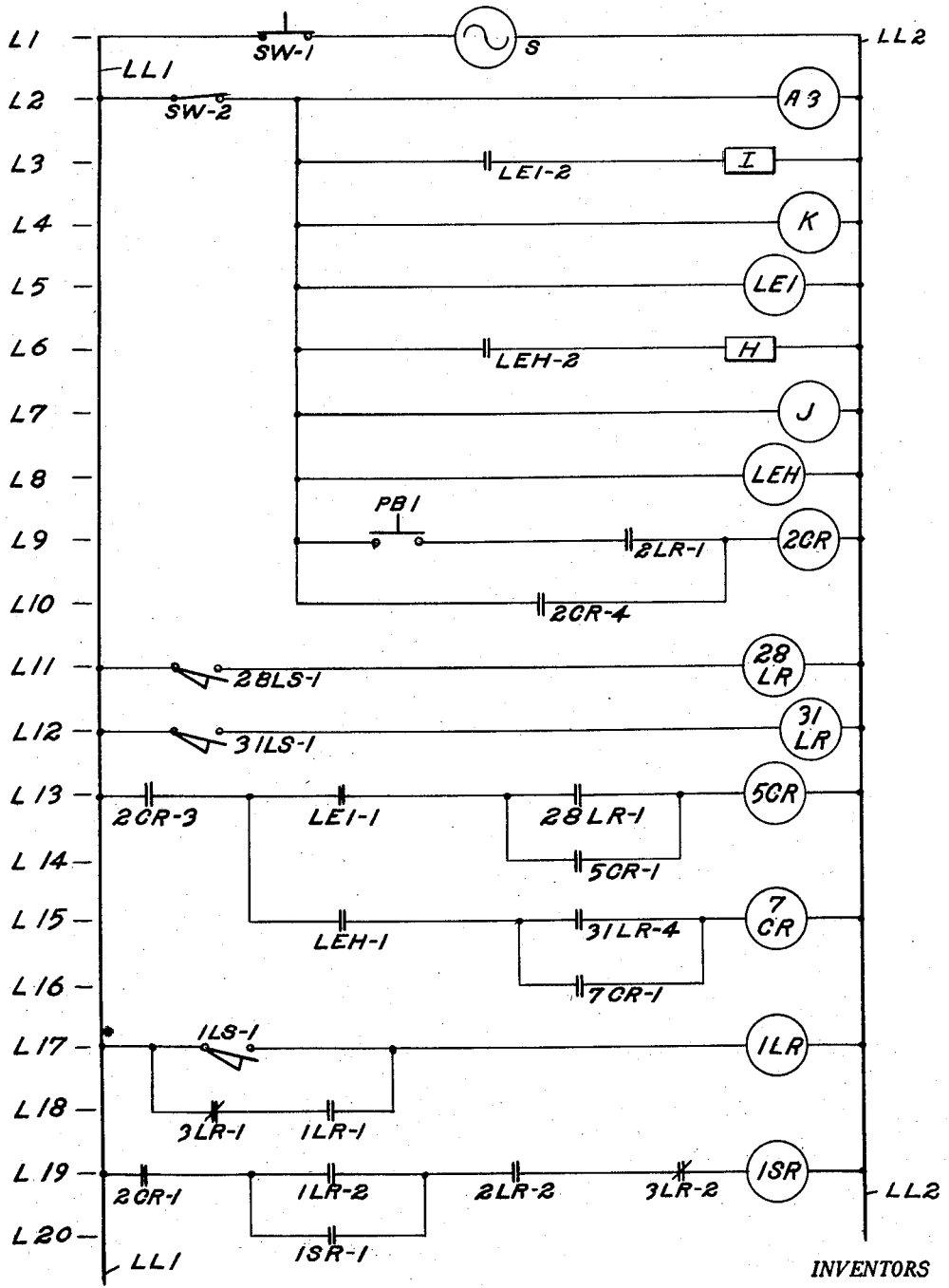
Figure 20:
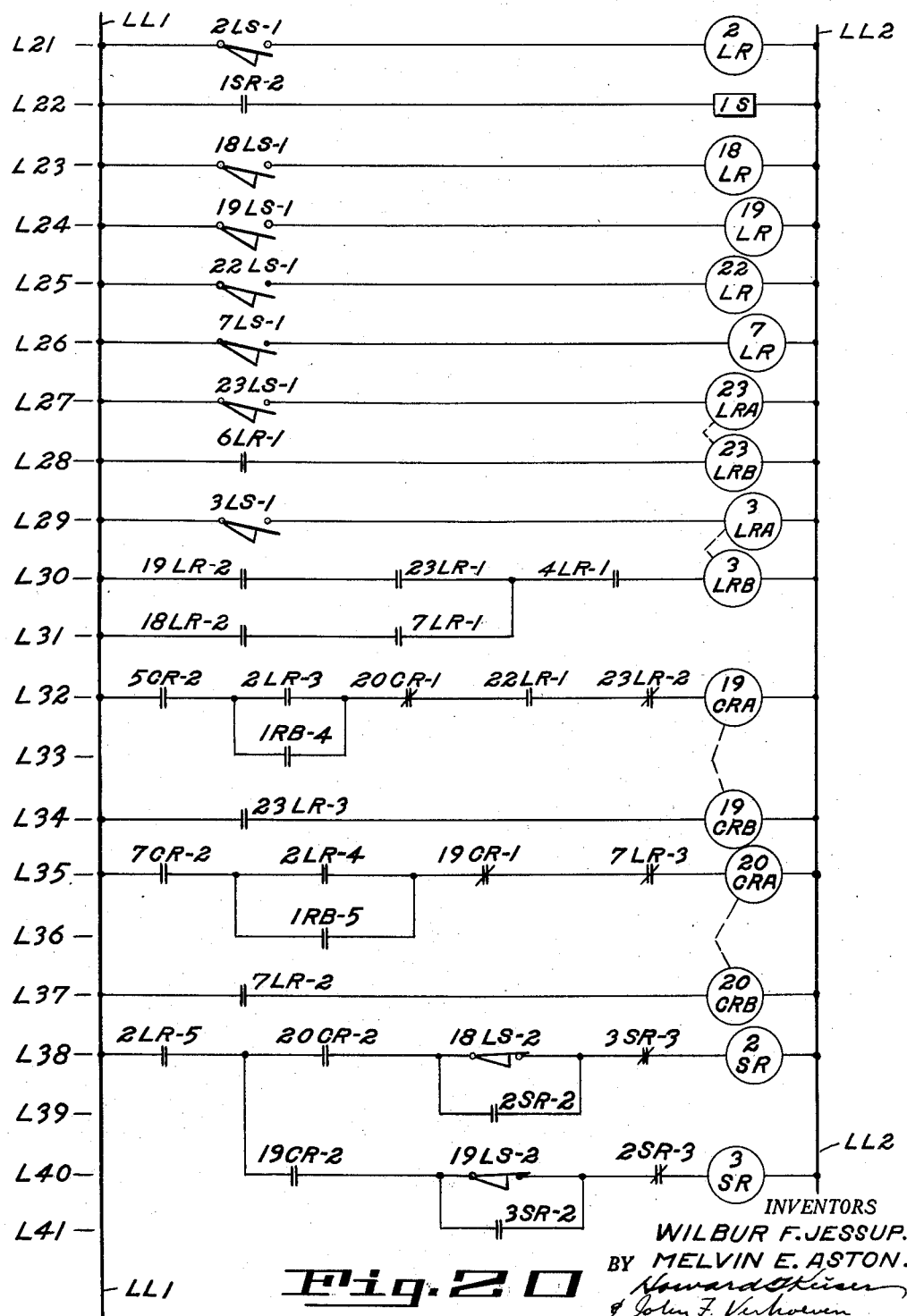
Figure 21:
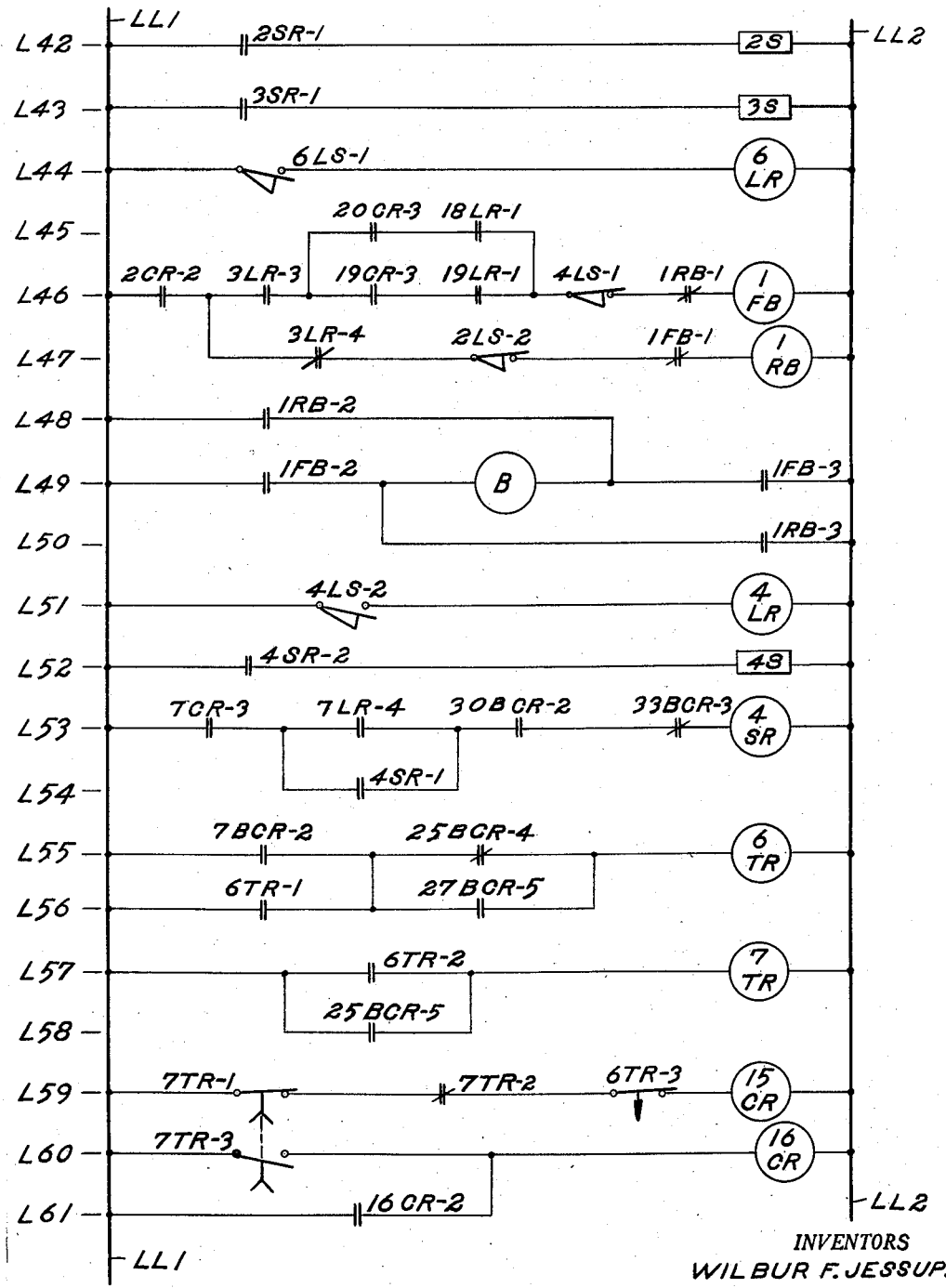
Figure 22:
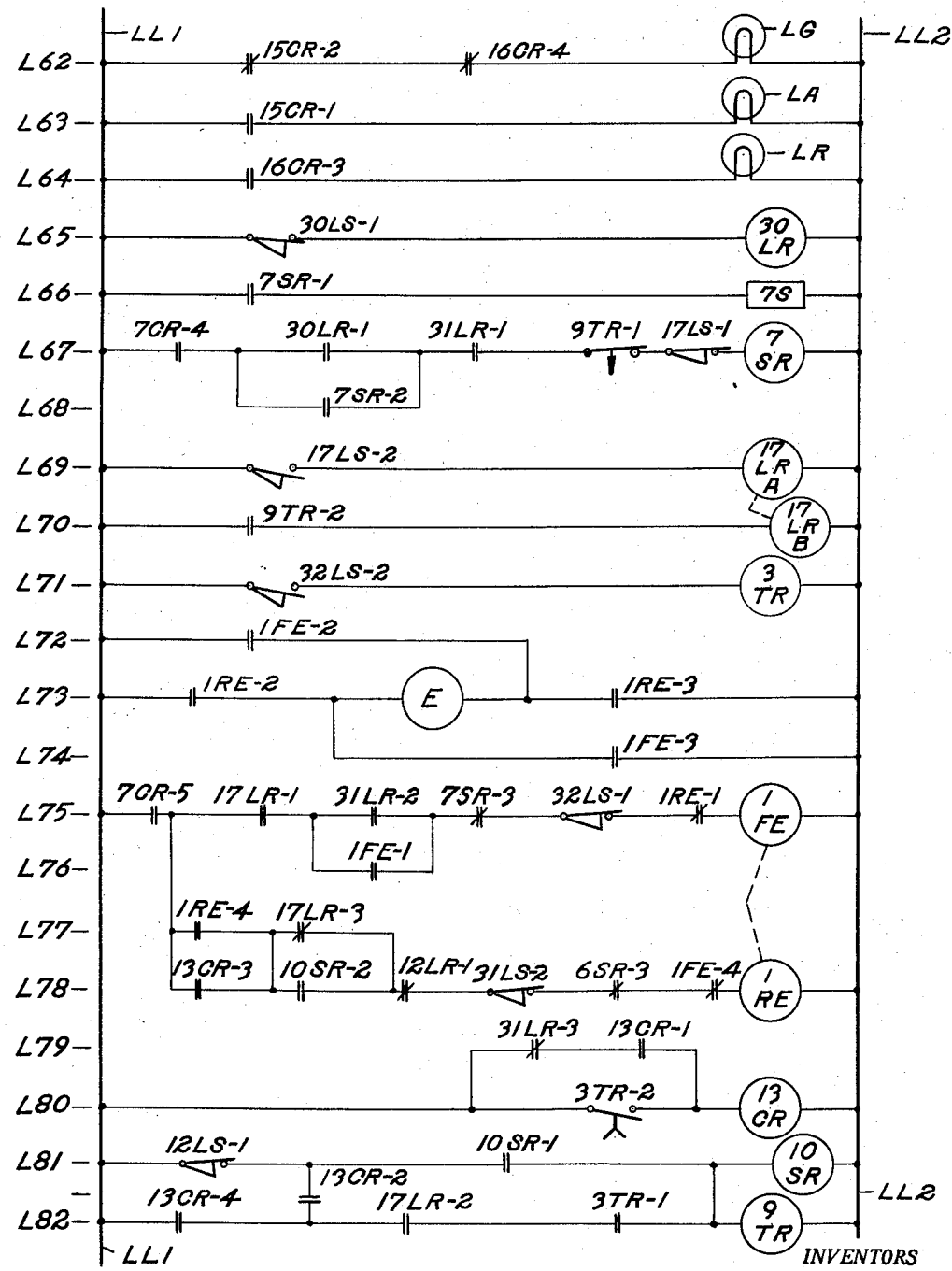
Figure 23:
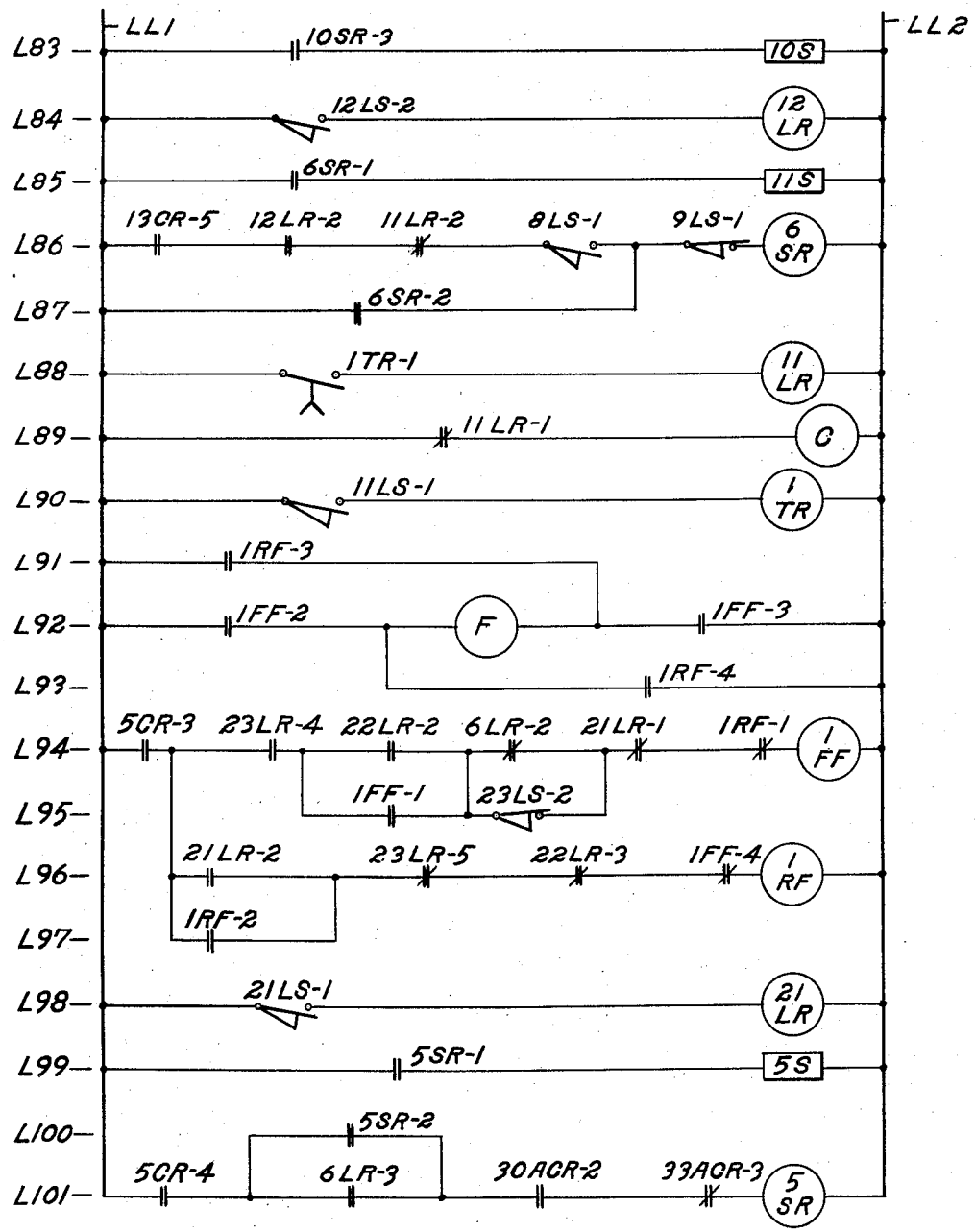

As shown in Figs. 13, 14, and 15, elevating device E-3 has a frame 175 supporting top and bottom rotatable drums 176 and 177 respectively which carry an endless belt 178 so that the belt defines an inclined conveyor for the workpieces. The belt has cleats 179 spaced to receive a workpiece therebetween and the elevator has side panels 180 and 181 to hold the workpieces on the belt, the panels extending from a point above the ways 147 and 148 to a point below track T-4 upon which the workpiece is deposited. The top drum 176 is rotated to drive the belt by motor C and gear reducer 182 through chain 183. The escapement mechanism 149 on way 148 consists of a flipper 185 having a downstream portion 186 and an upstream portion 187. The flipper is connected to the way to pivot alternately between a receive position with the downstream portion extending through the rails of the way and into the path of the workpieces, and a deliver position with the upstream portion of the flipper extending between the rails. The flipper has a channel member 188 on one side thereof. An arm 189 is pivotally connected to a vertical plate 190 extending from the base of the elevating device. The arm at its outer end is secured to one end of a shaft 191 normal thereto which has a link 192 at its opposite end normal to shaft 191, the arm, shaft, and link defining a crank. The link has a roller 196 which is received in the channel 188 on the flipper to swing the flipper as the arm 189 is pivoted. Piston rod 193 of cylinder 8C is pivotally connected to arm 189 through link 197 to actuate the flipper from the receive position to the deliver position and roll a workpiece at the escapement onto the moving belt 178 between the cleats 179 thereof when the cylinder 8C is operated. A vertical plate 200 connected to the frame 175 by bracket 201 supports a rail 202 which is aligned with one of the rails of ways 147 and 148. Rail 202 is spaced from the belt 178 and supports a workpiece received from the ways until a cleat 179 lifts the workpiece off the rail 202. The escapement mechanism 150 on way 147 is similar to the escapement mechanism 149 and is actuated when cylinder 6C is operated. At the top, the elevating device has a counterweighted arm 195 which in its normal position extends over the belt at an angle thereto and guides workpieces ascending on the belt from between the cleats onto track T–4.

The "in" turnaround T–I is located in way 66 leading to machine MA–3 and operates to rotate a workpiece 180° for proper orientation in machine MA–3. Machine MA–3 is similar to machine MB–3 but faces in the opposite direction to that machine at work station WS–3 so that both machines can conveniently receive workpieces from a common source. The "in" turnaround T–I, as shown in Fig. 16, is carried on platform 151 and is operated by motor F in conjunction with gear reducer 152 which, through chain 153, rotates shaft 154 in hub 155. A circular plate 156 is rotated by shaft 154 and rotates circular turntable 157, which is loosely received thereon, through the annular clutch facing 158. The turntable 157 carries for rotation therewith a blind chute 159 adapted to receive a workpiece and having a way 160 at the bottom thereof to support the workpiece. A fixed circular casing 161, having openings 162 spaced 180° apart to permit passage of the workpiece, encircles the turntable and is supported above the platform 151 by supports 163. Depending from the turntable 157 is a dog 164 adapted to engage stop supports 165 mounted on the platform 151 substantially 180° apart which define the limits of the 180° rotation of the turntable. At one extreme position the chute 159 is in the receive position aligned with and facing one of the openings 162 in the casing which is aligned with the way 66 leading from the lowering device LD–2. In the other extreme position, the deliver position, the chute is aligned with and faces the opposite opening in the casing which is aligned with the way 66 leading to machine MA–3. It will be noted that although there may be some override of the motor F, the turntable 157 is positively stopped at the proper positions by the stops 165, and slippage will occur between plate 156 and turntable 157 since the turntable is driven only through the clutch facing 158.

Figure 17:
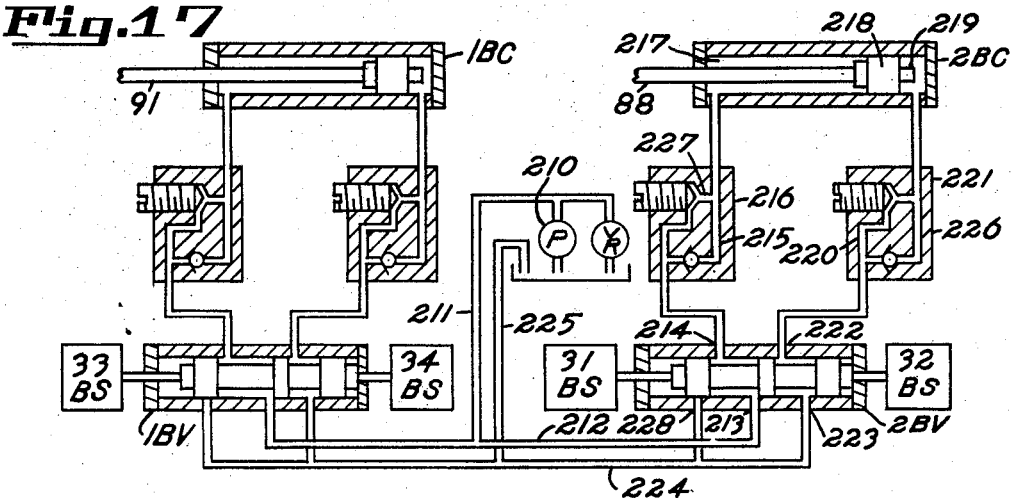
Fig. 17 is a schematic hydraulic diagram of the loader mechanism of the machine.

The hydraulic diagram for the operation of the loader of machine MB–3 is shown in Fig. 17. The operation of cylinder 2BC, and hence the upper arm 85, is controlled through the double solenoid valve 2BV having solenoids 31BS and 32BS. When the valve is in the position shown, with solenoid 31BS energized, pressure is supplied from pump 210 through conduits 211 and 212 to port 213 of valve 2BV. Port 213 is connected through the valve to port 214, and pressure is therefore supplied primarily through the free flow passage 215 of valve 216, to chamber 217 of cylinder 2BC. This retracts piston 218, and piston rod 88, to lower the top arm 85 of the loader. Discharge from chamber 219 occurs through the restricted passage 220 of valve 221, port 222 of valve 2BV, through the valve to port 223, and through conduits 224 and 225 to discharge. The energization of solenoid 32BS shifts the valve to the left of the position shown, and pressure is supplied from port 213 to 222 through valve 2BV and through the free flow passage 226 of valve 221 to chamber 219. This extends the piston rod 88 and raises the upper arm 85. Discharge from chamber 217 occurs through the restricted passage 227 of valve 216, port 214 of valve 2BV, through that valve to port 228, and through conduits 224 and 225 to discharge.

Cylinder 1BC and valve 1BV are constructed similarly to cylinder 2BC and valve 2BV and operate in a like manner. When solenoid 33BS is energized the valve is in the position shown and the piston rod 91 is retracted and the bottom arm 89 is in the lower position. When solenoid 34BS is energized the valve member is shifted to the left of the position shown, and piston rod 91 is extended to raise the bottom arm 89.

The schematic diagram for the pneumatically operated mechanisms is shown in Fig. 18. The escapement 40 at the lowering device is operated by cylinder 1C which is controlled by valve 1V. Pressure from a source of compressed air 240 is supplied to port 241 of that valve. When the solenoid 1S is not energized, and the valve is in the position shown, port 241 is connected through the valve to port 242 which is connected by conduit 243 to chamber 244 of cylinder 1C. Thus, when solenoid 1S is not energized, piston rod 46 is extended and workpieces are held by the escapement. Air is exhausted from chamber 246 through conduit 247 to port 248 of valve 1V and through that valve and out port 249. When solenoid 1S is energized, the valve member is shifted to the right and pressure is supplied through the valve to port 248, through conduit 247 to chamber 246. This retracts piston rod 46, actuating the escapement 40 to release a workpiece therefrom. Air is exhausted from chamber 244 through conduit 243 to port 242, through valve 1V and out port 250.

The unloader mechanism is operated by cylinder 2C which is controlled by the double solenoid valve 2V. Pressure is supplied to port 251 and, when solenoid 2S is energized and the valve is in the position shown, pressure is supplied through the valve to port 252. Port 252 is connected by conduit 253 to chamber 254 of cylinder 2C, and pressure therein retracts piston rod 72 connected to the unloader 70 to set the unloader for delivery to way 67. Air is exhausted from chamber 255 through conduit 256, port 257 of valve 2V, and through that valve and port 258. When solenoid 3S is energized the valve member is shifted to the right of the position shown, and pressure is supplied through the valve to port 257 and chamber 255 of the cylinder 2C to extend piston rod 72 and set the unloader for delivery to way 66. Air is exhausted from chamber 254 through conduit 253, port 252, valve 2V, and port 259 of that valve.

Cylinders 3C, 4C, and 7C operate, respectively, escapements 80, 120, and 260 at machine MB–3, wash device WD–3B, and machine MA–3, and are controlled by valves 3V, and 4V, and 7V, the valves and cylinders being similar in construction and operation to valve 1V and cylinder 1C. Cylinder 3C is actuated to release a workpiece from escapement 80 into machine MB–3 on energization of solenoid 4S; cylinder 4C is actuated to release a workpiece from escapement 120 on energization of solenoid 7S; and cylinder 7C is actuated to release a workpiece from escapement 260 on energization of solenoid 5S.

Cylinder 5C on wash device WD–3B (Fig. 12) is controlled by valve 5V and when solenoid 10S is deenergized and the valve member in the position shown, pressure is supplied from port 270, through the valve to port 271, through conduit 272, to chamber 273 of cylinder 5C to retract the pin 126 connected to piston 274. Air is exhausted from chamber 275 of cylinder 5C through conduit 276, port 277 of valve 5V, through that valve, and port 278. When solenoid 10S is energized the valve member is shifted to the right of the position shown and pressure is supplied through port 277 to chamber 275, extending pin 126 to tilt the wash device cradle.

Air is exhausted from chamber 273 through conduit 272, through port 271 and valve 5V to port 279.

Cylinder 6C is controlled by valve 6V, the cylinder and valve being similar in construction and operation to valve 1V and cylinder 1C. When solenoid 11S is energized, piston rod 280 is retracted, actuating the elevating device escapement 150 to release a workpiece into the elevating device E–3.

The circuit diagram for station WS–3 of the transfer mechanism is shown in Fig. 19, 20, 21, 22, and 23. In the following description of the circuit the numbers prefixed with the letter L in parenthesis correspond to the numbers along the left hand margin of the drawing and indicate the locations of the parts on the drawing. The contacts for each relay are numbered to correspond to their relay, and have a numerical suffix to distinguish between contacts of the relay. Limit switch contacts, which are shown with a weight, are normally closed when shown above the terminals and normally open when shown below the terminals. Other contacts having a diagonal line therethrough are normally closed.

Line LL1, through switch SW–1, and line LL2 are connected to a source of energy S (L1) and energize the track motor A–3 (L2) which operates track T–3 in the same manner as motor A–4 operates track T–4. Source S also energizes the demagnetizer unit motors J (L7) and K (L4), relays LEH (L8) and LEI (L5) through switch SW–2. Demagnetizers H (L6) and I (L3) are also energized when the normally open contacts LEH–2 and LEI–2 are closed. Relay 2CR (L9) is energized through switch SW–2, normally open push button switch PB–1 and normally open contact 2LR–1 of relay 2LR and is held energized through its own normally open contact 2CR–4 connected across PB–1 and contact 2LR–1. Limit switches 28LS and 31LS are located on the frames of the wash devices WD–3A and WD–3B, respectively, for operation by dogs on the endless gear reducer driven chain (see Fig. 11) and their contacts, normally open contact 28LS–1 (L11) and normally open contact 31LS–1 (L12) are closed when the respective cradles therein are at the top. This energizes relays 28LR (L11) and 31LR (L12), which are connected in series, respectively, with contacts 28LS–1 and 31LS–1 across lines LL1 and LL2, and closes their normally open contacts 28LR–1 (L13) and 32LR–4 (L15). Contact 28LR–1 is connected in series with normally open contact 2CR–3, normally open contact LEI–1, and relay 5CR across lines LL1 and LL2. Normally open contact 5CR–1 is connected across contact 28LR–1 to seal in the relay. Contact 31LR–4 is connected in series with normally open contact 2CR–3, normally open contact LEH–1, and relay 7CR. Normally open contact 7CR–1 is connected across contact 31LR–4.

Limit switch 1LS is located at the downstream end of track T–3 (see Fig. 2) and is operated by a workpiece held by the lowering device escapement 40 to close normally open contact 1LS–1 (L17). When closed, this contact energizes relay 1LR with which it is connected in series across lines LL1 and LL2, and relay 1LR is held energized through normally closed contact 3LR–1 and its own normally open contact 1LR–1 connected in series across contact 1LS–1. Limit switch 2LS is located at the top of the lowering device and when the cradle is in its top position this switch is operated by a dog 57 on the top member of the cradle carriage (see Figs. 5 and 6), closing normally open contact 2LS–1 (L21) and opening normally closed contact 2LS–2 (L47). This energizes relay 2LR (L21), connected in series with contact 2LS–1, and closes normally open contacts 2LR–2 (L19). Limit switch 3LS is located at the top of the lowering device, and an arm 58 pivotally connected to the cradle is actuated by a workpiece in the cradle to operate the limit switch when the cradle is in its top position (see Fig. 6). Limit switch 3LS has a normally open contact 3LS–1 (L29) connected in series with coil 3LRA of relay 3LR to energize that coil when the switch is operated. Relay 3LR is of the mechanical latch type having two coils and a latch. Energization of one of the coils 3LRA operates the relay which is then latched, and energization of the other coil 3LRB (L30) releases the latch.

When a workpiece is located at the lowering device escapement 40, no workpiece is in the lowering device cradle 76, and the cradle is at the top, relay 1SR (L19) is energized through normally open contacts 2CR–1, 1LR–2, and 2LR–2, and normally closed contact 3LR–2 and is sealed in by its own normally open contact 1SR–1 connected across contact 1LR–2. This closes normally open contact 1SR–2 (L22) and energizes solenoid 1S, connected in series with that contact, to actuate the lowering device escapement and release a workpiece to the cradle. This operates limit switch 3LS, energizing relay 3LR (L29), opening contact 3LR–1 (L18) to drop out relay 1LR, opening contact 3LR–2 (L19) to drop out relay 1SR and deenergize solenoid 1S, closing normally open contact 3LR–3 (L46) and opening normally closed contact 3LR–4 (L47).

The lowering device unloading mechanism operates to deliver workpieces to the machine requiring workpieces or, if both require workpieces, alternately, to one machine and then the other. Limit switch 18LS and 19LS are located on the frame 59 at the unloading mechanism (see Fig. 6) and are operated, respectively, when the mechanism is set for delivery to machine MB–3 and machine MA–3 by engagement of the arms 70 and 69, respectively, as the mechanism is tilted. Limit switch 18LS has normally open contact 18LS–1 (L23) and normally closed contact 18LS–2 (L38), the former being connected in series with relay 18LR. Limit switch 19LS has normally open contact 19LS–1 (L24) and normally closed contact 19LS–2 (L40), the former connected in series with relay 19LR.

Limit switch 7LS is located at the downstream end of way 67 leading to machine MB–3 (see Fig. 5) and is operated when a workpiece is at the machine escapement 80. Limit switches 22LS and 23LS are located at the ingoing turnaround TI (see Fig. 16) in way 66 to machine MA–3, limit switch 22LS being mounted on one of the stops 165 and operated by dog 164 on the turntable 157 for operation when the turntable is in the "receive" position with the chute 159 facing the lowering device LD–2, and the limit switch 23LS being mounted below the turnaround and having a plunger slidably received in shaft 154 and normally extending through way 160 for operation by a workpiece in the chute. Normally open limit switch contact 7LS–1 (L26) is connected in series with relay 7LR across lines LL1 and LL2 and normally open limit switch contact 22LS–1 (L25) is connected in series with relay 22LR across those lines. Normally open limit switch contact 23LS–1 (L27) is connected in series with coil 23LRA of relay 23LR which is of the mechanical latch type, similar to relay 3LR.

When the lowering device cradle 76 is up, or on its way up, the turnaround T–I is in the "receive" position, no workpiece is on the turnaround, and a workpiece is at the escapement 80 to machine MB–3, coil 19CRA (L32) of latching relay 19CR will be energized through normally open contacts 5CR–2, 2LR–3 or 1RB–4, normally closed contact 20CR–1, 23LR–2, and normally open contact 22LR–1. If at this time the unloader 68 is set for delivery to machine MB–3 and consequently limit switch 19LS is not operated, relay 3SR (L40) will be energized when the cradle reaches the top through normally open contacts 2LR–5, 19CR–2 and normally closed contacts 18LS–2 and 2SR–3. Relay 3SR is sealed in through its normally open contact 3SR–2 connected across contact 19LS–2. This energizes solenoid 35 (L43) through normally open contact 3SR–1 and shifts the unloader 68 to the left as shown in Fig. 6 for delivery to machine MA–3. It should be noted that if the unloader was already set for delivery to machine MA-3 neither 3SR nor solenoid 3S would have been energized. Thus, when machine MA-3 requires a workpiece and machine MB-3 does not, the unloader is set for delivery to machine MA-3.

When the lowering device cradle 76 is up, or on its way up, no workpiece is at the escapement 80 to machine MB-3, and no workpiece is required for machine MA-3, coil 20CRA (L35) of latching relay 20CR is energized through normally open contacts 7CR-2, 2LR-4, or 1RB-5 and normally closed contacts 19CR-1 and 7LR-3. If the unloader 68 is set for delivery to machine MA-3 so that limit switch 18LS is not operated, relay 2SR (L38) will be energized when the cradle reaches the top through normally open contacts 2LR-5 and 20CR-2 and normally closed contacts 18LS-2 and 3SR-3, being sealed in through its own normally open contact 2SR-2. Thus, solenoid 2S (L42), connected in series with contact 2SR-1, is energized to shift the unloader to the right as shown in Fig. 6 to deliver to machine MB-3. If already so set relay 2SR will not be picked up. Thus, the unloader is set for delivery to machine MB-3 if that machine requires workpieces and machine MA-3 does not.

Relay 1FB (L46) is energized through normally open contacts 2CR-2, 3LR-3, normally closed contacts 4LS-1 and 1RB-1, and one of the branches consisting, respectively, of series connected normally open contacts 20CR-3 and 18LR-1 and series connected normally open contacts 19CR-3 and 19LR-1. Since relay 20CR is energized only when no workpiece is at the escapement to machine MB-3 and relay 19CR is energized only when no workpiece is in the turnaround T-I to machine MA-3, relay 1FB is energized only when one or both machines require workpieces. If neither machine requires workpieces relay 1FB and motor B (L49) are not energized, and the cradle remains at the top. With relay 1FB energized, the lowering device motor B is energized through normally open contacts 1FB-2 and 1FB-3 to lower the cradle. Limit switch 4LS is located on the frame 59 of the lowering device (see Fig. 6) and is operated by dog 57 on the carriage 62 when the cradle is down, opening contact 4LS-1 (L46) to deenergize relay 1FB and motor B, and closing normally open contact 4LS-2 (L51) to energize relay 4LR. The workpiece rolls out to either the escapement 80 at machine MB-3 or the turnaround T-I to machine MA-3, depending on the setting of the unloader.

When the workpiece reaches the escapement 80 or the turnaround T-I, coil 3LRB (L30) of relay 3LR is energized, either through normally open contacts 19LR-2, 23LR-1, and 4LR-1 or through normally open contacts 18LR-2, 7LR-1, and 4LR-1 to release relay 3LR. This energizes relay 1RB (L47) through normally closed contacts 3LR-4, 2LS-2, and 1FB-1 to contact reversible motor B across lines LL1 and LL2 through normally open contacts 1RB-2 and 1RB-3 opposite to its connection through the contacts of relay 1FB. This raises the cradle 76 to the top of the lowering device LD-2. Latch relay 19CR or 20CR, whichever one was energized, is released when the workpiece reaches the turnaround T-I or the escapement 80, since normally open contact 23LR-3 (L34) or 7LR-2 (L37) closes at that time to energize either coil 19CRB of relay 19CR or coil 20CRB of relay 20CR. Relay 23LR, which becomes energized when a workpiece is in the turnaround T-I, is released when a workpiece reaches the escapement 260 to machine MA-3 because that workpiece operates limit switch 6LS at the escapement to close normally open contact 6LS-1 (L44) and energize relay 6LR, thereby closing normally open contact 6LR-1 (L28). This energizes the release coil 23LRB of relay 23LR to release that relay.

It will be noted that if both machines are consuming workpieces as delivered and consequently both machines continuously require workpieces, the mechanism will operate to deliver workpieces alternately to the two machines. If, for example, a workpiece is delivered to machine MA-3, relay 19CR will drop out when that workpiece reaches the turnaround T-I. When the cradle starts to the top relay 20CR will be picked up and, since the unloader is set for delivery to machine MA-3, contact 18LS-2 (L38) will be closed to energize relay 2SR and solenoid 2S (L42) to shift the unloader for delivery to machine MB-3. The next time the cradle ascends relay 3SR (L40) will be energized since, at that time, contact 19LS-2 is closed while contact 18LS-2 is open, and solenoid 3S (L43) will be energized to shift the unloader for delivery to machine MA-3.

In a single machine station the portion of the circuit between lines L23 and L47, inclusive, may be as shown in Fig. 25. In a single machine station the unloader mechanism 68 may be fixed in the position shown in solid lines in Fig. 6 and cylinder 2C, and limit switches 18LS and 19LS, eliminated. Coil 3LRA of latch relay 3LR will be energized when contact 3LS-1 is closed by a workpiece in the cradle at the top of the lowering device. This closes normally open contact 3LR-3. Relay 1FB, connected in series with normally open contacts 2CR-2, 3LR-3 and normally closed contacts 7LR-5, 4LS-1, and 1RB-1 will be energized only if contact 7LS-1 is open and relay 7LR deenergized because no workpiece is at escapement 80. Energization of relay 1FB energizes motor B to lower the cradle and deliver the workpiece therein to way 67. When the workpiece reaches escapement 80 contact 7LS-1 is closed, relay 7LR energized to close contact 7LR-1, and coil 3LRB is energized to release relay 3LR. This energizes relay 1RB to reverse the motor B and raise the cradle.

Relay 4SR (L53) is connected across lines LL1 and LL2 in series with normally open contacts 7CR-3 and 7LR-4 together with two contacts from machine MB-3, normally open contact 30BCR-2 and normally closed contact 33BCR-3. This circuit is closed to energize relay 4SR, and thereby energize solenoid 4S (L52) through contact 4SR-2 to operate the escapement 80 to machine MB-3, when a workpiece is at the escapement, the top arm of the machine loader is up, and no workpiece is on the top arm. Relay 4SR has normally open contact 4SR-1 connected across contact 7LR-4.

Machine MB-3 operates automatically to receive a workpiece from way 67, to cycle the workpiece through the grinding operation, and to deliver the workpieces to way 99 if there is space downstream for it. As shown in the machine circuit diagram of Fig. 24, line BL-1 having a switch BSW therein, and line BL-2 are connected to source BS. Relay 3BCR (L6) of machine MB-3 is connected across these lines and energized through the normally closed "stop" push button switch BPB-3, the normally open push button switches BPB-1 and BPB-2, and the normally closed contact 16CR-1, and remains closed while the machine is cycling properly. Relay 3BCR is sealed in through its normally open contact 3BCR-1 connected across switches BPB-1 and BPB-2. Line BL-3 is connected to line BL-1 through contact 3BCR-1 and switch BPB-3. Toggle switch 1BSW is located on the loader 81 of machine MB-3 (see Fig. 8) and is operated by a pair of angularly spaced dogs 290 and 291 carried by the shaft 94 which carries the top arm 85 of the loader, contact 1BSW-1 (L8) being open and 1BSW-2 (L9) being closed when the top arm is in its upper position. Toggle switch 2BSW is operated by angularly spaced dogs 292 and 293 carried by shaft 95 which carries the bottom arm 89, contact 2BSW-1 being open and contact 2BSW-2 being closed when the bottom arm is in its upper position. Limit switch 12BLS, having normally closed contact 12BLS-1 (L11) and normally open contact 12BLS-2 (L19), is located on machine MB-3 and is operated by dog 294 on the wheelhead slide 295 when the grinding wheel is in its retracted position (see Fig. 5). Limit switch 31BLS having normally open contacts 31BLS-1 (L12) is located in the machine loader chute and is operated by a workpiece on the top arm 85.

When the grinding wheel retracts, normally closed contact 12BLS–1 is opened, deenergizing relay 25BCR (L11) to close normally closed contact 25BCR–3 (L14). When a workpiece is on the top arm 85 normally open contact 31BLS–1 (L12) is closed and pick-up coil 33BCRA of latch relay 33BCR is energized to close its normally open contact 33BCR–2 (L14). Since the top arm is up, contact 1BSW–1 is open and relay 5BCR (L8) is deenergized so that its normally closed contact 5BCR–3 (L14) is closed. As hereafter described, limit switch 30LS is located at the wash device escapement 120 and if no workpiece is there, relay 30LR (Fig. 22, L65) is deenergized and its normally closed contact 30LR–1 (L14) is closed. As will be described hereafter, relay 8BCR (L15) is energized when the grinding operation is completed and therefore if a workpiece is waiting on the top arm 85, and if there is space downstream for a workpiece, relay 7BCR (L14) will be energized through contacts 8BCR–2, 33BCR–2, 5BCR–3, 25BCR–3, and 30LR–1 at the end of the grinding operation to close its normally open contact 7BCR–1 (L2) and energize solenoid 34BS. As shown in Figs. 8 and 17, this raises the lower arm and delivers the workpiece 20 to way 99 leading to the demagnetizer H and wash station WD–3B.

When the top arm 85 is up contact 1BSW–2 (L9) is closed and relay 30BCR is energized, holding closed the normally open contact 30BCR–1 (L7). As the bottom arm reaches its top position, contact 2BSW–2 (L7) closes and since normally open contact 30BCR–1 and normally closed contact 25BCR–1 are closed, relay 4BCR (L7) is energized to close its normally open contact 4BCR–1 and energize solenoid 31BS (L3). This lowers the upper arm 85 to deposit the workpiece on the raised lower arm, dropping out relay 30BCR (L9). At the same time, normally open contact 4BCR–2 (L17) is closed to energize relay 26BCR through that contact and normally closed contact 27BCR–1, relay 26BCR being sealed in by normally open contact 26BCR–1 connected across contact 4BCR–2. As the top arm reaches its lower position contact 1BSW–1 is closed, energizing relay 5BCR (L8) and closing the normally open contact 5BCR–2 (L13). This energizes release coil 33BCRB through normally open contacts 33BRC–1 and 5BCR–2 to drop out relay 33BCR. Normally open contact 5BCR–1 is closed to energize solenoid 33BS (L4) and lower the lower arm 89 to deposit the workpiece 20 on the shoes 92 for grinding. Contact 2BSW–1 (L10) is closed when the lower arm reaches bottom to energize relay 6BCR, and hence solenoid 32BS (L5), through normally open contact 6BCR–1 to raise the upper arm. Limit switch 13BLS is operated by dog 294 when the wheelhead is fully advanced (see Fig. 5) and so at this time normally closed contact 13BLS–1 (L19) is closed and relay 27BCR is energized through normally open contacts 26BCR–2, 6BCR–3, 12BLS–2 and the normally closed contact 13BLS–1. Normally open contacts 27BCR–2 and 27BCR–3 are connected, respectively, across contacts 26BCR–2 and 12BLS–2. When relay 27BCR is energized, relay 26BCR (L17) is dropped out and normally open contact 27BCR–4 (L21) is closed, supplying a signal for the wheelhead circuit to initiate the feed cycle, and energizing the magnetic chuck 98.

As the wheelhead moves off its retracted position limit switch 12BLS is released, closing 12BLS–1 (L11) and energizing relay 25BCR. This energizes relay 8BCR (L15) through normally open contact 25BCR–2 and that relay is sealed in through normally open contacts 6BCR–2 and 8BCR–1. When the wheelhead completes the grinding operation normally closed contact 13BLS–1 (L19) is opened, deenergizing relay 27BCR. When the wheelhead retracts the lower arm 89 is raised to deliver the workpiece if a workpiece is on the top arm and if there is no workpiece at the downstream escapement 120 to the wash device.

The apparatus circuit and the machine circuit operate to energize lights on the panel P (see Fig. 1) to indicate the status of the machine, a green light LG being energized when the machine, such as machine MB–3, is continuously cycling workpieces, an amber light LA when the machine is unable to cycle workpieces because it is either not being supplied workpieces or has no downstream space to deposit a workpiece, and a red light LR to indicate the machine is not properly cycling workpieces. Relay 6TR (L55) is initially energized through normally open contact 7BCR–2 and normally closed contact 25BCR–4 when the bottom arm 89 of the machine loader is raised after completion of a grinding operation. Timer relay 6TR is held in through its own contact 6TR–1 and contact 25BCR–4 after relay 7BCR drops out and, after relay 25BCR is energized, is held in through contact 6HR–1 and normally open contact 27BCR–5. Relay 27BCR of machine MB–3 (see Fig. 24, L19) drops out when the wheelhead is signaled to retract by operation of limit switch 13BLS and relay 6TR is deenergized until the bottom arm is again raised. Timer relay 7TR (L57) is energized through normally open contact 6TR–2 of relay 6TR and, after relay 6TR drops out, through normally open contact 25BCR–5. Relay 7TR is deenergized when the wheelhead reaches its retracted position, since relay 25BCR is dropped out at that time, providing a brief interval for the timer relay 7TR to reset before it is again energized through contact 6TR–2. Relay 15CR (L59) is connected in series with normally closed delay open contact 7TR–1, normally closed contact 7TR–2, and normally closed, delay close contact 6TR–3. Relay 15CR is deenergized while relay 6TR is energized and, if the machine is continuously receiving and delivering workpieces, remains deenergized through the entire cycle since contact 6TR–3 is set to remain open until after relay 6TR has again picked up. If relay 7BCR of machine MB–3 (Fig. 24, L14) is not energized, because there is no workpiece on the top arm 85 or there is no space at the wash device escapement 120 and consequently 6TR and 7TR are not picked up, relay 15CR (L59) will be energized when contact 6TR–3 closes to energize light LA (L63) through normally open contact 15CR–1 and thereby indicate that the machine MB–3 is waiting either for workpieces or space to place the workpieces.

Relay 16CR (L60) is connected in series with normally open delay close contact 7TR–3 and is sealed in through its own contact 16CR–2. Contact 7TR–3 is set to close after an elapse of time longer than the operating cycle of the machine so that when the machine is cycling normally relay 7TR is dropped out and reset before 7TR–3 closes. However, if, for some reason, the machine does not perform its sequenced functions in the specified time, relay contacts 25BCR–5 or 6TR–2 will keep relay 7TR (L57) energized, so that contact 7TR–3 closes, energizing relay 16CR and, through normally open contact 16CR–3, light LR (L64). Normally closed delay open contact 7TR–1 is opened at the same time contact 7TR–3 is closed to prevent energization of relay 15CR and light LA. Contact 16CR–1 is opened at this time, dropping out relay 3BCR–1 of machine MB–3 (Fig. 24, L6) and preventing further cycling of the machine. The red light LR therefore indicates that the machine is not operating properly, for reasons other than lack of workpieces or space, and that corrective measures must be taken. Green light LG (L62) is connected in series with normally closed contacts 15CR–2 and 16CR–4 and is energized while the machine is continuously cycling.

Limit switch 30LS is located at the wash device escapement 120 and is operated by a workpiece at that escapement. The limit switch has normally open contact 30LS–1 (L65) connected in series with relay 30LR. Relay 7SR (L67) is connected in series with normally open contacts 7CR–4, 30LR–1, 31LR–1, normally closed contact 9TR–1 and contact 17LS–1 of limit switch 17LS. Limit switch 17LS located at the top of the wash device (see Figs. 11 and 12) is operated when a workpiece is in the cradle 132, and the cradle is at the top of the device in the upright position. The cradle has an arm 296 pivotally received in the web of the cradle which is actuated by a workpiece in the cradle. The arm 296 has a shaft 297 normal thereto at its outer end which engages the switch arm of limit switch 17LS which is connected to the frame 125 of the wash device. Contact 7SR–2 is connected across contact 30LR–1. Contact 9TR–1 of timer relay 9TR is a delay close contact and prevents energization of relay 7SR until the cradle 132 has settled in the receiving position. Energization of relay 7SR, which occurs when the wash device is empty and a workpiece is at the wash device escapement, closes contact 7SR–1 and energizes solenoid 7S (L66) connected in series therewith and actuates the wash device escapement 120 to release a workpiece into the cradle 132. Limit switch 17LS is operated at this time to deenergize relay 7SR and energize the pick up coil 17LRA (L69) of latch type relay 17LR through normally open contact 17LS–2. This closes the circuit to relay 1FE (L75) which includes normally open contacts 7CR–5, 17LR–1, 31LR–2, and normally closed contacts 7SR–3, 32LS–1, and 1RE–1, with contact 1FE–1 connected across contact 31LR–2. Normally closed contact 32LS–1 of limit switch 32LS is closed at this time. Energization of relay 1FE closes contacts 1FE–2 and 1FE–3 to energize motor E (L73) and lower the cradle 132 to the bottom of the wash device.

As the cradle reaches the bottom, limit switch 32LS is operated. Thus contact 32LS–2 (L71) is closed and timer relay 3TR which is connected in series with that contact, is energized to close contact 3TR–1 (L82) and, after a delay, contact 3TR–2 (L80). Contact 3TR–2 closes after a sufficient time for washing the workpiece has elapsed and energizes relay 13CR (L80). Relay 13CR is sealed in by normally closed contact 31LR–3 and 13CR–1 in parallel with 3TR–2. Relays 10SR (L81) and timer relay 9TR (L82) are energized simultaneously through a network having one branch consisting of series connected normally closed contact 12LS–1, and normally open contact 10SR–1, a second branch consisting of normally open contacts 13CR–4, 17LR–2, and 3TR–1, said branches being connected through normally open contact 13CR–2. This closes contact 9TR–2 (L70) connected in series with the release coil 17LRB of relay 17LR and drops out that relay and closes normally open contact 10SR–2 (L78). Contact 10SR–3, connected in series with solenoid 10S (L83), is also closed and the solenoid is energized to extend the wash device unloader pin 126. Limit switch 12LS is located at the elevator escapement 150 and is operated by a workpiece at the escapement to open contact 12LS–1 and close contact 12LS–2, the latter contact being connected in series with relay 12LR (L84).

When no workpiece is at the elevator escapement, normally closed contact 12LR–1 is closed and, since relays 13CR and 10SR are energized at this time, relay 1RE (L78) will be energized through a path comprising normally open contacts 7CR–5, 13CR–3, 10SR–2, and normally closed contacts 12LR–1, 31LS–2, 6SR–3, and 1RE–4 and sealed in through normally open contact 1RE–4 and normally closed contact 17LR–3 connected, respectively, across contacts 13CR–3 and 10SR–2. This closes contacts 1RE–2 and 1RE–3 to reverse the motor E (L73) and raise the cradle 132 to the top of the wash device where it engages the unloader pin 126 and delivers a workpiece to the elevator escapement. The workpiece remains available for inspection until removed, as described hereafter, only when the following workpiece has been washed and is available to replace it.

Limit switch 11LS is located on the track T–4 leading to the downstream work station WS–4 near the upstream end thereof (see Fig. 5). The limit switch is operated only momentarily as workpieces roll past it but will be operated longer by a workpiece which comes to rest over it when the bank of workpieces on the track is as full as desired. Relay 1TR (590) is connected in series with normally open contact 11LS–1 of limit switch 11LS and is energized each time that switch is operated. Normally open delay close contact 1TR (L88) closes, however, only when the bank is full so that relay 11LR, connected in series therewith, is only energized when this conditions exists. Thus, the elevator motor C (L89), connected in series with normally closed contact 11LR–1, will operate only when there is space in the bank on track T–4.

When a workpiece is at the elevator escapement 150 relay 12LR (L84) is energized and normally open contact 12LR–2 is closed. If the following workpiece has been washed relay 13CR will be energized at this time. Limit switches 8LS and 9LS are located on the frame of elevator E–3, limit switch 8LS being operated by every other cleat 179 of endless belt 178 and limit switch 9LS being operated by the alternate cleats, the cleats being slightly staggered as shown in Fig. 14. Each has a normally open and normally closed contact, and when switch 8LS is operated, to close its normally open contact 8LS–1 (L86), and consequently switch 9LS is not operated and so its normally closed contact 9LS–1 is closed, relay 6SR will be energized through those contacts, connected in series with normally open contacts 13CR–5, 12LR–2, and normally closed contact 11LR–2. Relay 6SR is sealed in through contact 6SR–2. Energization of relay 6SR closes contact 6SR–1 to energize solenoid 11S (L85) and actuate the elevator escapement 150. If it is not desired to have a workpiece at escapement 150 available for inspection at all times contact 13CR–5 (L86) may be eliminated from the circuit by which relay 6SR is energized so that the escapement 150 will be actuated when space is available on track T–4 regardless of whether the following workpiece has been washed. It will be noted that the limit switches 8LS and 9LS are placed on the elevator frame so that the actuation of the escapement will be coordinated with the movement of the elevator belt so that a workpiece will roll between the cleats. Workpieces from machine MB–3 and workpieces from machine MA–3 are alternately escaped. The elevating device E–3 carries the workpiece to track T–4 where it is released for movement to the next work station. It will be evident that in a single machine work station one of the limit switches 8LS or 9LS would be eliminated and the one limit switch used would be operated by each cleat on the belt.

When the lowering device LD–2 is set for delivery to machine MA–3 a workpiece delivered from the lowering device rolls into the "in" turnaround TI, which at this time is in the "receive" position, and hence limit switches 22LS and 23LS are operated. Thus relays 22LR (L25) and coil 23LRA (L27) are energized while relay 21LR (L98) is deenergized. This latter relay is connected in series with normally open contact 21LS–1 of limit switch 21LS which is located on one of the stops 165 of the turnaround (see Fig. 16) substantially 180° from limit switch 22LS, and is operated only when the turn table 157 is in the "deliver" position. Relay 1FF (L94) is connected in series with normally open contacts 5CR–3, 23LR–4, 22LR–2, and normally closed contacts 6LR–2, 21LR–1 and 1RF–1 and is energized at this time if no workpiece is at the escapement 260 to machine MA–3, being sealed in through contacts 1FF–1, connected across contact 22LR–2 and normally closed contact 23LS–2, connected across contact 6LR–2. This energizes motor F (L92) connected in series across lines LL1 and LL2 with contacts 1FF–2 and 1FF–3 to rotate the turntable 157 to the "deliver" position where limit switch 21LS is operated to energize relay 21LR (L98) and deenergize relay 1FF and hence motor F. With relay 21LR energized contact 21LR-2 is closed and a circuit including relay 1RF (L96), contact 21LR-2, and normally closed contacts 23LR-5, 22LR-3, and 1FF-4 is closed, energizing relay 1RF. Relay 1RF is sealed in by contact 1RF-2 connected across relay 21LR-2. Contacts 1RF-3 and 1RF-4 are closed at this time, connecting motor F (L92) across lines opposite to those across which it was previously connected to reverse the motor and rotate the turntable 157 to the "receive" position.

When the turntable is in the deliver position the workpiece rolls to the escapement to machine MA, since the turnaround is inclined at the same angle as way 66, and the workpiece operates limit switch 6LS to energize relay 6LR (L44) and close contact 6LR-3 (L101). Relay 5SR (L101) is connected in series with normally open contacts 5CR-4, 6LR-3 and two contacts from machine MA-3, normally open contact 30ACR-2, and normally closed contact 33ACR-3, which correspond in operation and function to contacts 30BCR-2 and 33BCR-3 (L53) of machine MB-3, previously described. Thus, if the top arm of the loader of machine MA-3 is in the "up" position, no workpiece is on the top arm of the loader, and a workpiece is at the escapement 260, relay 5SR will be energized, closing contact 5SR-1 and energizing solenoid 5S (L99) connected in series with that contact. This actuates the machine MA-3 escapement 260 and delivers a workpiece to that machine. The workpiece is then ground in a manner similar to the operation in machine MB-3 and delivered to the way 299 leading through the demagnetizer I and to wash device WD-3A.

The workpiece is drawn through the demagnetizer I and rolls to the escapement 301 to the wash device WD-3A. Although the wash device is shown housed in the lower portion of the frame in which the lowering device LD-2 is located it may be constructed similarly to the wash device WD-3B and its escapement mechanism 301 and the wash device cradle may be controlled in a similar manner except that its operation will respond to signals produced by limit switch 14LS, which is operated when the turnaround "out" T-O is in the "receive" position, and 16LS which is released when the turnaround "out" is empty. After washing the workpiece rolls to the turnaround T-O in way 148.

The turnaround "out" will operate similarly to the turnaround "in" T-I except that it will respond to signals from limit switch 13LS which is located at the elevator escapement 149 and is operated by a workpiece there, instead of limit switch 6LS. After the workpiece has been turned around so that it is properly oriented it rolls to the escapement 149 at the elevating device. The escapement 149 will be operated similarly to the escapement 150, responding instead, however, to the opposite contacts of limit switch LS8 and LS9 to deliver a workpiece at the proper time to the elevating device E-3.

In operation workpieces are released from the downstream end of each station to the downstream track only when space is available on that track and are moved by the flippers toward the escapement at the downstream end of the track. If the workpieces are not released by the escapement at a rate as great as the rate at which workpieces are delivered to the track, the workpieces are banked from the downstream end and, when the track has a bank of predetermined desired quantity of workpieces, a limit switch is operated which disables the means, such as the elevating device E-3, which releases operated workpieces from the downstream work station.

Workpieces are automatically released singly from the track by the operation of the escapement thereon into a workpiece receiving and holding means, such as the lowering device LD-2, at the upstream end of the succeeding work station when the lowering device cradle is empty and at the top. In a work station having a single branch of operational devices such as a machine similar to machine MB-3 and a wash device similar to WD-3B, the lowering device is actuated to deliver a workpiece to the inclined way leading to the first device only when space is available at the escapement at the first device. The workpiece is released from that escapement when space is available in the device. The device, which performs an operation on the workpiece, and has means, such as the arm 89 of the machine loader, to release a workpiece therefrom, releases the workpiece only when space is available at the escapement at the next device. In this manner each workpiece is passed through each work station to the workpiece releasing means at the downstream end of the track, the operation of which is controlled by the quantity of workpieces on the downstream track.

Assume that station WS-3, despite its parallel branches of devices, is the slowest work station. When all work stations have been operating normally for some time, without down time for tool changes, adjustments or repairs, the track T-3 will be full and the track T-4 will be empty. This is because the upstream work stations will operate at their maximum capacity, which exceeds that of station WS-3, until track T-3 is full and thereafter will automatically operate intermittently so that their net ouput equals the maximum net rate at which the slowest station consumes workpieces. The downstream stations will operate at their maximum capacity, which is greater than station WS-3, until the track T-4 is empty and will, thereafter, operate only intermittently so that their net consumption equals the maximum output of station WS-3.

Therefore, if an upstream station goes down, station WS-3 will automatically continue operating at its maximum rate for a time, feeding off the bank of workpieces in track T-3, and finished workpieces will continue being produced by the line at the normal rate so long as workpieces remain in track T-3. When the upstream station is again operating it will automatically operate at maximum capacity until the normal condition of a full bank on track T-3 again exists.

If a downstream station goes down, delivery of finished workpieces from the line may temporarily cease but the slowest station will continue operating at its maximum capacity, filling the bank on track T-4 so that when the down station resumes operation it will be able to operate at its maximum capacity until the normal condition of an empty track T-4 again exists. In the meantime, however, finished workpieces will be produced by the line at a greater rate than normal. Thus, the slowest station, and hence the critical one, automatically operates at maximum capacity even though other stations are down temporarily, and the other stations automatically adjust their output to compensate for the down time, so that the line may continue producing finished workpieces at the normal rate.

What is claimed is:

1. A transfer mechanism for individually moving workpieces from a bank at the upstream end of a work station, through the work station, and to a bank at the downstream end of the work station, the mechanism comprising a plurality of operational devices arranged in consecutive order within the work station, means to move the workpieces in a predetermined path from the upstream bank consecutively through said devices to the downstream bank, an escapement in the path of the workpieces at the upstream end of each of said devices, each escapement being movable from a first position in which it defines a space to receive and hold a workpiece to a second position in which it releases the workpiece into the downstream device, means associated with each of said devices to signify that space is available for a workpiece therein, and means controlled by each signifying means to move the escapement at the upstream end of its associated device to said second position when space is available therein whereby said individual workpieces will be advanced seriatim from said upstream bank through said devices in the work station to said downstream bank.

2. A transfer mechanism for individually moving workpieces without contact therebetween from a bank at the upstream end of a work station, through the work station, and to a bank at the downstream end of the work station, the mechanism comprising a plurality of operational devices arranged in consecutive order within the work station, the devices having means when actuated to release a workpiece therefrom, means to move the workpieces in a predetermined path from the upstream bank consecutively through said devices to the downstream bank, an escapement in the path of the workpieces at the upstream end of each of said devices, each escapement being movable from a first position in which it defines a space to receive and hold a workpiece to a second position in which it releases the workpiece into the downstream device, means associated with each of said devices and escapements to signify that space is available for a workpiece, means controlled by the signifying means associated with each device to move the escapement at the upstream end of its associated device to said second position when space is available therein, and means controlled by the signifying means associated with each escapement to actuate the workpiece releasing means of the device upstream therefrom when space is available at the escapement whereby said individual workpieces will be advanced seriatim from said upstream bank through said devices in the work station to said downstream bank.

3. A transfer mechanism for individually moving workpieces without contact therebetween from a bank at the upstream end of a work station, through the work station, and to a bank at the downstream end of the work station, the mechanism comprising a plurality of operational devices arranged in consecutive order within the work station, the devices having means when actuated to release a workpiece therefrom, means to move the workpieces in a predetermined path from the upstream bank consecutively through said devices to the downstream bank, escapements in the path of the workpieces including escapements at the upstream end of each of said devices, each escapement being movable from a first position in which it defines a space to receive and hold a workpiece to a second position in which it releases the workpiece, means associated with each of said devices, with each of said escapements, and with said downstream bank to signify that space for a workpiece is available, means controlled by the signifying means associated with each device to move the escapement at the upstream end of its associated device to said second position when space is available in the device, means controlled by the signifying means associated with each escapement to actuate the workpiece releasing means of the device upstream therefrom when space is available at the escapement, and means controlled by the signifying means associated with the downstream bank to move the workpiece from the downstream end of the path in the work station to the downstream bank when space is available in that bank.

4. A transfer mechanism for individually moving roller workpieces without contact therebetween from a bank at the upstream end of a work station, through the work station, and to a bank at the downstream end of the work station, the mechanism comprising conveying devices at the upstream and downstream end of the work station to carry workpieces from the upstream bank and to the downstream bank, respectively, each conveying device having means when actuated to release from its downstream end a workpiece received therein, a plurality of operational devices within the work station having means when actuated to release a workpiece therefrom, inclined ways between the conveying devices connecting the operational devices in consecutive order, an escapement in the ways at the upstream end of each of said operational devices and downstream from the last operational device, each escapement being movable from a first position in which it defines a space to receive and hold a workpiece to a second position in which it releases the workpiece, means associated with each of said operational devices, with each of said escapements, and with said downstream bank to signify that space for a workpiece is available, means controlled by the signifying means associated with the escapement at the upstream end of the first operational device to actuate the conveying device at the upstream end of the work station when space is available at said escapement, means controlled by the signifying means associated with each operational device to move the escapement at the upstream end of its associated device to said second position when space is available in the device, means controlled by the signifying means associated with each escapement to actuate the workpiece releasing means of the device upstream therefrom when space is available at the escapement, and means controlled by the signifying means associated with the downstream bank to move the escapement downstream from the last operational device and actuate the conveying device at the downstream end of the work station when space is available in the downstream bank.

5. A transfer mechanism for individually moving roller workpieces without contact therebetween from an elevated bank at the upstream end of a work station, through the work station, and to an elevated bank at the downstream end of the work station, the mechanism comprising a lowering device at the upstream end of the work station to carry workpieces from the upstream bank, an elevating device at the downstream end of the work station to carry workpieces to the downstream bank, the lowering and elevating devices having means when actuated to release from their downstream ends a workpiece received therein, a grinding machine and a wash device within the work station having means when actuated to release a workpiece therefrom, inclined ways between the lowering device and elevating device connecting the grinding machine and wash device in that order, an escapement in the ways at the upstream end of the lowering device, the grinding machine, the wash device and the elevating device, each escapement being movable from a first position in which it defines a space to receive and hold a workpiece to a second position in which it releases the workpiece, means including limit switches associated with the grinding machine, the wash device, the escapements, and the downstream bank to signify that space for a workpiece is available, means controlled by the signifying means associated with the lowering device to move the escapement at the upstream end of the lowering device to the second position when space is available in the lowering device, means controlled by the signifying means associated with the escapement at the upstream end of the grinding machine to actuate the lowering device when space is available at said escapement, means controlled by the signifying means associated with the grinding machine to move the escapement at the upstream end of the grinding machine to said second position when space is available in the grinding machine, means controlled by the signifying means associated with the escapement at the upstream end of the wash device to actuate the workpiece releasing means of the grinding machine when space is available at that escapement, means controlled by the signifying means associated with the wash device to move the escapement at the upstream end of the wash device when space is available in the wash device, means controlled by the signifying means associated with the escapement at the upstream end of the elevating device to actuate the workpiece releasing means of the wash device when space is available at that escapement, and means controlled by the signifying means associated with the downstream bank to move the escapement at the upstream end of the elevating device to the second position and actuate the elevating device when space is available in the downstream bank.

6. A control system for governing the movement of workpieces from an upstream bank through a work station to a downstream bank, the work station having a plurality of operational devices arranged in consecutive order and means to move a workpiece in a predetermined path from said upstream bank consecutively through the devices to the downstream bank, the devices having space to receive a workpiece therein and having means when actuated to release a workpiece therefrom, the control system comprising: means in the upstream bank to release a workpiece therefrom when actuated; means at the upstream end of the path to receive and hold a workpiece released from the upstream bank, said means operable when actuated to release a workpiece therefrom; means at the downstream end of the path to release workpieces to the downstream bank; escapements in the path including escapements at the upstream end of each operational device, each escapement being movable from a first position in which it defines a space to receive and hold a workpiece to a second position in which it releases the workpieces downstream; means associated with the workpiece receiving and holding means at the upstream end of the station, the operational devices, and the escapements, respectively, to signify space for a workpiece is available; means controlled by the signifying means associated with the workpiece receiving and holding means to actuate the workpiece releasing means in the upstream bank when space is available in said receiving and holding means; means controlled by the signifying means associated with the upstream escapement in the path to actuate the workpiece receiving and holding means to release a workpiece therefrom when space is available at the upstream escapement; means controlled by the signifying means associated with the operational devices to move the escapements at the upstream end of the devices, respectively, to the second position to release a workpiece therefrom when space is available in the devices; means controlled by the signifying means associated with the escapements to actuate the workpiece releasing means of the operational device upstream from an escapement when space is available at that escapement; and means operable in response to a predetermined number of workpieces in the downstream bank to disable the workpiece releasing means at the downstream end of the work station.

7. A signaling system in a work station including a machine tool having mechanism to receive and hold a workpiece in an operating position and perform an operation thereon in a cycle of predetermined duration, the work station defining space upstream and space downstream from said operating position for a workpiece, the signaling system comprising: a source of energy; means to signify the presence of a workpiece in the space upstream from said operating position and the absence of a workpiece in the space downstream from said operating position; a first signaling means; timer means operable to connect said first signaling means to said source of energy after a period longer than said cycle if not reset; means controlled by said signifying means to reset said timer means during each cycle in response to the presence of a workpiece upstream from said operating position and the absence of a workpiece downstream from said operating position; a second signaling means; timer means operable to connnect said second signaling means to said source of energy after a period longer than said cycle if not reset; and means controlled by the machine tool mechanism to reset said timer means in response to completion of said cycle.

8. A signaling system in a work station including a machine tool having mechanism to receive and hold a workpiece in an operating position and perform an operation thereon in a cycle of predetermined duration, the work station defining space upstream and spaced downstream from said operating position for a workpiece, the signaling system comprising: a source of energy; means to signify the presence of a workpiece in the space upstream from said operating position and the absence of a workpiece in the space downstream from said operating position; a first signaling means; timer means operable to connect said first signaling means to the source of energy after a period longer than said cycle if not reset; means controlled by said signifying means to reset said timer means during each cycle in response to the presence of a workpiece upstream from said operating position and the absence of a workpiece downstream from said operating position; a second signaling means; timer means operable to connect said second signaling means to said source of energy after a period longer than said cycle if not reset; means controlled by the machine tool mechanism to reset said timer means in response to completion of said cycle; a third signaling means; means controlled by the deenergization of said first and second signaling means to connect said third signaling means to the source of energy when said first and second signaling means are deenergized.

9. A control mechanism to supply workpieces from a bank of workpieces alternately to two devices at a work station when both devices require workpieces or to supply workpieces continuously to one of said devices when the other does not require workpieces comprising in combination: a pair of ways connected, respectively, at one end to each of said devices; an unloader mechanism operable when set to deliver a workpiece to one of said ways; means to signify the setting of the unloader mechanism for the delivery of the previous workpiece; means to signify the presence of a workpiece at each of said devices; means to release a workpiece from said bank; means to move a workpiece from the bank to the unloader mechanism; means responsive to the setting of the unloader mechanism for the delivery of the previous workpiece when no workpiece is at either device to select the way not receiving the previous workpiece; means responsive to the absence of a workpiece at one of said devices and the presence of a workpiece at the other device to select the way connected to said one device; and means responsive to said selection to set the unloader mechanism to deliver a workpiece to the selected way.

10. A control mechanism to supply roller workpieces from a bank of workpieces alternately to two devices at a work station when both devices require workpieces or to supply workpieces continuously to one of said devices when the other does not require workpieces comprising in combination: a pair of inclined ways connected, respectively, at their lower ends to each of said devices; an unloader mechanism operable when set to deliver a workpiece to one of said ways; switch means to signify the setting of the unloader mechanism for the delivery of the previous workpiece; means to release a workpiece from said bank; means to move a workpiece from the bank to the unloader mechanism; a switch at each device operable when a workpiece is at the device; means responsive to the setting of the unloader for the delivery of the previous workpiece when neither switch at the device is operated to select the way not receiving the previous workpiece; means responsive to the operation of the switch at one of said devices only to select the way connected to the other device; and means responsive to said selection to set the unloader mechanism to deliver a workpiece to the selected way.

11. A control mechanism to supply roller workpieces from a bank of workpieces alternately to two devices at a work station when both devices require workpieces or to supply workpieces continuously to one of said devices when the other does not require workpieces comprising in combination: a pair of inclined ways connected, respectively, at their lower ends to each of said devices; an unloader mechanism operable when set to deliver a workpiece to one of said ways; switch means operated in response to the setting of the unloader mechanism for the delivery of the previous workpiece; a cradle adapted to receive a workpiece movable between the bank and the unloader mechanism; means to signify the cradle is empty; means to signify the cradle is at the bank; means automatically to release a workpiece from the bank to the cradle when the cradle is empty and at the bank; a switch at each device operated by a workpiece at the device; means responsive to the setting of the unloader for the delivery of the previous workpiece when neither switch is operated to select the way not receiving the previous workpiece; means responsive to the operation of the switch at one of said devices only to select the way connected to the other device; means responsive to said selection to set the unloader mechanism to deliver a workpiece to the selected way; and means to move the cradle from the bank to the unloader mechanism when one of said switches is not operated.

12. A control mechanism to supply roller workpieces from a bank of workpieces alternately to two devices at a work station when both devices require workpieces or to supply workpieces continuously to one of said devices when the other does not require workpieces comprising in combination: a cradle adapted to receive a workpiece and tiltable to deliver a workpiece therefrom; a pair of inclined ways, one of said ways connected at its lower end to one of said devices and the other of said ways connected at its lower end to the other of said devices; an unloader mechanism shiftable between a first position to tilt the cradle upon contact therewith and deliver a workpiece to said one way and a second position to tilt the cradle to deliver a workpiece to said other way; a switch at each device operated by a workpiece at the device; means to move the cradle to the bank; means to release a workpiece from the bank to the cradle when the cradle is at the bank; means to shift the unloader mechanism when neither switch is operated; means responsive to the operation of the switch at said one device only to shift the unloader mechanism to the second position when in the first position; means responsive to the operation of the switch at said other device only to shift the unloader to the first position when in the second position; and means to move the cradle from the bank to the unloader mechanism for contact therewith when one of said switches is not operated.

13. A control mechanism to supply roller workpieces from an elevated bank of workpieces alternately to two devices at a work station when both devices require workpieces or to supply workpieces continuously to one of said devices when the other does not require workpieces comprising in combination: a pair of inclined ways, one of said ways connected at its lower end to one of said devices and the other of said ways connected at its lower end to the other of said devices; a lowering device, the top of which is adjacent the bank and the bottom of which is adjacent the ways, the lowering device having a tiltable cradle movable between the top and bottom thereof and having an unloader mechanism at the bottom thereof shiftable btween a first position to tilt the cradle upon contact therewith for delivery of a workpiece to said one way and a second position to tilt the cradle to deliver a workpiece to said other way; a switch at each device operated by a workpiece at the device; means automatically to release a workpiece from the bank to the cradle when the cradle is empty and at the bank; means to shift the unloader when neither switch is operated; means responsive to the operation of the switch at said one device only to shift the unloader mechanism to the second position when in the first position; means responsive to the operation of the switch at said other device only to shift the unloader to the first position when in the second position; and means to move the cradle from the bank to the unloader mechanism for contact therewith when one of said switches is not operated.

14. A mechanism defining a work station operable automatically to pass workpieces therethrough without contact between said workpieces from a bank at the upstream end of the work station to a bank at the downstream end thereof, the mechanism comprising: means defining a pair of paths for the workpieces; a plurality of operational devices in each of said paths, each having means to receive a workpiece released thereto and perform an operation on said workpiece, and each having means when actuated to release said workpiece from the device, said devices in each path defining a consecutive series; means to move the workpieces in said paths; workpiece arresting means in the paths including escapements at the upstream end of the devices operable in one position to define a space for a workpiece and hold a workpiece received therein, and movable to a second position when actuated to release said workpiece; means to signify space is available for a workpiece at the workpiece arresting means; means to indicate space is available in each of the devices; means to indicate space is available in the downstream bank; means to move a workpiece from the upstream bank to one of said paths in response to space available at the upstream workpiece arresting means thereof and no space available at the upstream workpiece arresting means of the other path; means to move a workpiece from the upstream bank to one of said paths when space is available at the upstream workpiece arresting means of both paths in response to delivery of the previous workpiece to the other of said paths; means to actuate the workpiece arresting means in the paths and release a workpiece in response to space available immediately downstream therefrom; means to actuate the workpiece releasing means of a device in response to space available immediately downstream therefrom; and means to move workpieces from the downstream end of the paths in response to space available in the downstream bank.

15. An integrated apparatus for automatically passing a workpiece through a series of work stations where successive operations are performed thereon comprising means at the upstream end of each work station to receive and hold a workpiece, means in each work station to transport the workpiece therethrough and to perform one of the operations thereon to produce a workpiece ready for the next operation, means in each work station to release the operated workpiece therefrom, a track connecting consecutive work stations, said track including means to receive workpieces released from the upstream station, an escapement at the downstream end of the track, and means to move workpieces received thereon toward the escapement at the downstream end of the track, means at the work station located at the downstream end of the track to signify the absence of a workpiece in the receiving and holding means thereof, means controlled by said signifying means to operate said escapement and release a workpiece to the downstream work station whereby a bank of workpieces is accumulated on the track when workpieces are released from the track at a rate slower than the rate at which workpieces are received thereon, and means operating in response to the accumulation of a predetermined number of workpieces on the track to disable said releasing means in the work station at the upstream end of the track whereby overfilling of the bank of workpieces on the track is prevented and each work station may continue to operate despite the inoperativeness of any other work station until the bank of workpieces on the track upstream or the space available on the track downstream is exhausted.

16. An integrated apparatus for automatically passing a workpiece through a series of work stations where successive operations are performed thereon, each work station having means at the upstream end thereof to receive and hold a workpiece, means at the downstream end thereof to release a workpiece, a plurality of operational devices arranged in consecutive order within the work station, each of said devices having means when actuated to release a workpiece therefrom, means to move the workpieces in a predetermined path from the upstream end of the work stations consecutively through said devices to the downstream end of the work station, an escapement in the path of the workpieces at the upstream end of each of said devices, each escapement being movable from a first position in which it defines a space to receive and hold a workpiece to a second position in which it releases a workpiece, means associated with each of said devices and the escapements to signify that space for a workpiece is available, means controlled by the signifying means associated with each device to move the escapement at the upstream end of its associated device to said second position when space is available therein, means controlled by the signifying means associated with each escapement to actuate the workpiece releasing means of the device upstream therefrom when space is available at the escapement, a track connecting consecutive work stations, said track including means to receive workpieces released from the upstream station, an escapement at the downstream end of the track, and means to move workpieces received thereon continuously toward the escapement at the downstream end of the track, means at the work station located at the downstream end of the track to signify the absence of a workpiece in the receiving and holding means thereof, means controlled by said signifying means to operate said track escapement and release a workpiece to the downstream work station whereby a bank of workpieces is accumulated on the track when workpieces are released from the track at a rate slower than the rate at which workpieces are received thereon, and means operating in response to the accumulation of a predetermined number of workpieces on the track to disable said releasing means at the downstream end of the upstream work station.

17. An integrated apparatus for automatically passing roller workpieces in spaced relation through a series of work stations where successive operations are performed thereon, each work station having conveying devices at the upstream and downstream end thereof, each conveying device having means when actuated to release from its downstream end a workpiece received therein, a plurality of operational devices within the work station having means when actuated to release a workpiece therefrom, inclined ways between the conveying devices connecting the operational devices in consecutive order, an escapement in the ways at the upstream end of each of said operational devices and downstream from the last operational device, each escapement being movable from a first position in which it defines a space to receive and hold a workpiece to a second position in which it releases a workpiece, means associated with each of said operational devices, with the conveying device at the upstream end of the work station, and with each of said escapements to signify that space for a workpiece is available, means controlled by the signifying means associated with the escapement at the first operational device to actuate the conveying device at the upstream end of the work station when space is available at that escapement, means controlled by the signifying means associated with each operational device to move the escapement at the upstream end of its associated device to said second position when space is available in the device, means controlled by the signifying means associated with each of the escapements downstream from the operational devices to actuate the workpiece releasing means of the operational device upstream therefrom when space is available at the escapement, a track connecting consecutive work stations, said track including means to receive workpieces released from the upstream station, an escapement at the downstream end of the track, means to move workpieces received thereon continuously in spaced relation toward the escapement at the downstream end of the track, means controlled by the signifying means in the conveying device at the upstream end of the downstream work station to release a workpiece from the track escapement when space is available in said conveying device, and means operating in response to space available for a workpiece on a track to move the escapement downstream from the last operational device of the downstream work station to its second position and actuate the downstream conveying device of said work station.

18. An integrated apparatus for automatically passing a workpiece through a series of work stations where successive operations are performed thereon comprising means at the upstream end of each work station to receive and hold a workpiece, means in each work station to transport the workpiece therethrough and to perform one of the operations thereon to produce a workpiece ready for the next operation, means in each work station to release the operated workpiece therefrom, a track connecting consecutive work stations with its upstream end connected to the upstream station to receive workpieces released therefrom and its downstream end connected to the succeeding station, an escapement at the downstream end of the track being movable from a first position in which it defines a space to receive and hold a workpiece to a second position in which it releases the workpiece to the downstream station, and means including periodically actuated flippers to move workpieces received on the track continuously in spaced relation toward the downstream end thereof, means at the work station located at the downstream end of the track to signify the absence of a workpiece in the receiving and holding means thereof, means controlled by said signifying means to move said escapement to its second position momentarily to release one workpiece therefrom, and means operating in response to the accumulation of a predetermined number of workpieces on the track to disable said releasing means in the work station at the upstream end of the track.

19. An integrated apparatus for automatically passing a workpiece through a series of work stations where successive grinding operations are performed thereon comprising a device at the upstream end of each work station having means to receive and hold a workpiece, means in each work station including a grinding machine having an automatic loader to transport the workpieces therethrough and to perform one of the operations thereon to produce a workpiece ready for the next operation, means in each work station including a device at the downstream end of the station to release the operated workpiece therefrom, a track connecting consecutive work stations with its upstream end connected to the upstream station to receive workpieces released therefrom and its downstream end connected to the succeeding station, an escapement at the downstream end of the track being movable from a first position in which it defines a space to receive and hold a workpiece to a second position in which it releases the workpiece to the downstream station, and means including periodically actuated flippers to move workpieces received on the track continuously in spaced relation toward the downstream end thereof, means including a limit switch associated with the upstream device of the work station to signify the absence of a workpiece therein, means controlled by said signifying means to move said escapement to its second position momentarily to release one workpiece therefrom, and means including a limit switch at the upstream end of the track and timer means to signify the more than temporary presence of a workpiece on the upstream end of the track, and means controlled by said last signifying means to disable the workpiece releasing means of the upstream work station.

20. An integrated apparatus for automatically performing successive operations on a workpiece comprising: a plurality of work stations each having means at the upstream end thereof to receive and hold a workpiece released thereto and each having a machine having mechanism to receive and hold a workpiece in an operating position and perform an operation thereon in a cycle of predetermined duration, the work station having means defining a path through the work station for a workpiece, said path having means defining a plurality of spaces for a workpiece including space upstream and downstream from said operating position, the work station having means to move a workpiece along said path in response to space available immediately downstream, each work station having means to release a workpiece therefrom; a track connecting consecutive work stations having means to receive workpieces released from the upstream work station and an escapement at the downstream end operable to release a workpiece in response to the absence of a workpiece in the upstream space of the downstream station, the track having means continuously to move workpieces received thereon toward the downstream end and bank said workpieces when workpieces are released from the track at a rate slower than the rate at which workpieces are received thereon; means automatically to terminate release of workpieces from the upstream work station in response to a predetermined quantity of workpieces on the track; means in each station to indicate the presence of a workpiece in the space upstream from said operating position and the absence of a workpiece in the space downstream from said operating position; a first signaling means; timer means operable to energize said first signaling means after a period longer than said cycle if not reset; means controlled by said signifying means to reset said timer means during each cycle in response to the presence of a workpiece in the space upstream from said operating position and the absence of a workpiece in the space downstream from said operating position; a second signaling means; timer means operable to energize said second signaling means after a period longer than said cycle if not reset; and means controlled by the machine mechanism to reset said timer means in response to completion of said cycle.

21. An integrated apparatus for automatically passing a workpiece through a series of work stations where successive operations are performed thereon comprising means at the upstream end of each work station to receive and hold a workpiece, a machine in each station, means to move the workpieces in a predetermined path from the workpiece receiving and holding means at the upstream end of the station through the machine to the downstream end thereof, at least one of said stations having two machines in parallel paths, means in the path of the workpieces to arrest the movement thereof, means in each work station at the downstream end thereof to release the operated workpieces therefrom, a track connecting consecutive work stations, said track including means to receive workpieces released from the upstream station, means to move workpieces received thereon toward the escapement at the downstream end of the track, means to signify the absence of a workpiece in the receiving and holding means at the upstream end of the work stations, means controlled by said signifying means to operate the track escapement of the upstream track, means associated with the upstream workpiece arresting means in the paths of the workpieces within the station to signify the absence of a workpiece, means controlled by the signifying means associated with the upstream workpiece arresting means in the path to release workpieces from said receiving and holding means of the work station, the station with parallel paths having means controlled by the signifying means associated with the upstream workpiece arresting means in the parallel paths to deliver workpieces alternately to said paths when no workpiece is at either of said upstream workpiece arresting means and to deliver workpieces continuously to one path when a workpiece is at the upstream arresting means of the other path, and means operating in response to the accumulation of a predetermined number of workpieces on the track downstream from a work station to disable said releasing means in the work station.

22. An integrated apparatus for automatically passing a workpiece through a series of work stations where successive operations are performed thereon comprising means at the upstream end of each work station to receive and hold a workpiece, a plurality of operational devices arranged in consecutive order in each station, each device having means when actuated to release a workpiece therefrom, means to move the workpieces in a predetermined path from the workpiece receiving and holding means at the upstream end of the work station consecutively through said devices to the downstream end thereof, at least one of said stations having two sets of devices in parallel paths, means in the paths of the workpieces to arrest the movement thereof and release the same when actuated including escapements at the upstream end of each device, means in each work station at the downstream end thereof to release the operated workpieces therefrom, means associated with each device and each workpiece arresting means to signify space is available for a workpiece, means controlled by the signifying means associated with the devices to operate the escapements at the upstream end thereof and release a workpiece to the devices when space for a workpiece is available therein, means controlled by the signifying means associated with the escapements to actuate the workpiece releasing means of the device upstream from an escapement when space is available for a workpiece at the escapement, means controlled by the signifying means associated with the workpiece arresting means at the upstream end of the paths to release a workpiece from said receiving and holding means when space is available at said workpiece arresting means, the work station with parallel paths having means controlled by the signifying means of the workpiece arresting means at the upstream ends of the parallel paths to deliver workpieces alternately to said paths when no workpiece is at either workpiece arresting means and to deliver workpieces continuously to one path when a workpiece is at the workpiece arresting means at the upstream end of the other path, a track connecting consecutive work stations, said track including means to receive workpieces released from the upstream station, an escapement at the downstream end of the track, means to move workpieces received thereon toward the escapement at the downstream end of the track, means to signify the absence of a workpiece in the receiving and holding means of the work station, means controlled by said signifying means to operate the track escapement of the upstream track and release a workpiece to said workpiece receiving and holding means when space is available therein, and means operating in response to the accumulation of a predetermined number of workpieces on the track downstream from a work station to disable said releasing means in the work station.

23. A control system for an apparatus having a plurality of mechanisms defining work stations, the apparatus having elevated tracks connecting the work stations with means to move workpieces downstream in spaced relation and, when workpieces are delivered to the track by the upstream station at a greater rate than said workpieces are delivered to the downstream station, to bank workpieces in spaced relation, each work station having devices connected in series by inclined ways including a lowering device located to receive a workpiece from the downstream end of the upstream track, a grinding machine, and a wash device, and at least one of said work stations having parallel branches of series connected devices, the control mechanism comprising: escapements at the lowering devices, the grinding machines, and the wash devices operable when actuated to release a workpiece to said devices, the lowering device escapement being located at the downstream end of the upstream track; an unloader in the lowering device of the work station with parallel branches of devices operable in response to available space at the first device of one branch and the presence of a workpiece at the first device of the other branch to set the lowering device for delivery of a workpiece to said one branch and operable in response to available space at the first devices of both branches and delivery of the previous workpiece to one branch to set the lowering device for delivery of a workpiece to said other branch; means to actuate the escapements at the lowering device, grinding machine, and work devices when space is available in the respective devices; means to deliver a workpiece from the lowering devices and the machines when there is no workpiece at the escapement of the device downstream therefrom; and means to elevate the workpieces and deliver the same from the downstream end of the work station to the upstream end of the downstream track in response to space available on said track.

24. An apparatus for automatically passing workpieces through a series of work stations, each of said stations operable to perform one of a plurality of successive operations on the workpieces, the apparatus comprising in combination: means in each work station to receive and hold a workpiece in the work station prior to the operation thereon; means in each work station to release an operated workpiece from the work station after the operation thereon; means in each work station to transport a workpiece through the work station; a plurality of tracks on which workpieces are continuously urged downstream, each of said tracks connected between consecutive work stations to receive operated workpieces released from the connected upstream station and each of said tracks having an escapement at the downstream end thereof; means in each of the work stations connected to the downstream end of a track to signify the absence of a workpiece in the receiving and holding means thereof; means controlled by said signifying means to operate the escapement in the upstream track and release a workpiece for movement to the receiving and holding means of the work station whereby a bank of workpieces is built up from the downstream end of each track when workpieces are released from the track to the downstream work station at a rate slower than the rate at which workpieces are released to the track by the upstream work station; and means operating in response to the accumulation of a predetermined number of workpieces on the track to disable the connected upstream work station and terminate the release of operated workpieces therefrom whereby overfilling of the bank of workpieces on the track is prevented and each work station may continue to operate despite the inoperativeness of any other work station until the bank of workpieces on the track upstream or the space available on the track downstream is exhausted.

References Cited in the file of this patent

UNITED STATES PATENTS

| | | |
|---|---|---|
| 2,791,069 | Cleiff | May 7, 1957 |
| 2,805,524 | Silven | Sept. 10, 1957 |
| 2,814,919 | Jones et al. | Dec. 3, 1957 |
| 2,835,082 | Green | May 20, 1958 |